United States Patent
Iida

[19]

[11] Patent Number: 6,123,258
[45] Date of Patent: Sep. 26, 2000

[54] INFORMATION EMBEDDING AND RESOLVING METHOD AND APPARATUS

[75] Inventor: Hiroshi Iida, Kanagawa, Japan

[73] Assignee: Fuji Xerox Co., Ltd., Tokyo, Japan

[21] Appl. No.: 09/095,898

[22] Filed: Jun. 11, 1998

[30] Foreign Application Priority Data

Jun. 12, 1997 [JP] Japan .................................. 9-155435

[51] Int. Cl.⁷ .................................................. G06F 17/00
[52] U.S. Cl. ........................ 235/375; 235/436; 235/494; 902/4
[58] Field of Search ...................... 235/375, 376, 235/380, 382.5, 436, 437, 449, 462.25, 494; 902/2, 4, 40

[56] References Cited

U.S. PATENT DOCUMENTS

| | | | |
|---|---|---|---|
| 3,632,995 | 1/1972 | Wilson | 235/494 X |
| 5,367,319 | 11/1994 | Graham | 235/494 X |
| 5,468,945 | 11/1995 | Huggett et al. | 235/494 X |
| 5,521,372 | 5/1996 | Hecht et al. | 235/494 |
| 5,568,555 | 10/1996 | Shamir | 235/494 X |

FOREIGN PATENT DOCUMENTS

| | | |
|---|---|---|
| 4-111140 | 4/1992 | Japan . |
| 7-262216 | 10/1995 | Japan . |
| 8-87562 | 4/1996 | Japan . |
| 8-185533 | 7/1996 | Japan . |
| 8-254987 | 10/1996 | Japan . |
| 8-255258 | 10/1996 | Japan . |
| 8-314486 | 11/1996 | Japan . |

Primary Examiner—Michael G Lee
Attorney, Agent, or Firm—Finnegan, Henderson, Farabow, Garrett & Dunner, L.L.P.

[57] ABSTRACT

An information processing method in which after various sorts of information such as voice, image, and moving picture are printed as embedding information on a printing medium such as paper, the embedding information is scanned to reproduce the embedding information in an optimum form thereof. In the information processing method, original information is inputted from an input apparatus, attribute information of the original information is inputted, the original information is combined with the attribute information in accordance with a correspondence relationship therebetween to thereby produce information to be embedded, embedding information is produced from the information to be embedded, the embedding information is printed on a recording medium, the embedding information is read-scanned to thereby input image information, the embedding information is recognized from the inputted image information, the recognized embedding information is resolved into the original information and the attribute information so as to determine an output apparatus used to reproduce the original information in accordance with the attribute information corresponding thereto, and the original information is outputted to the output apparatus.

15 Claims, 18 Drawing Sheets

FIG. 15A — DOCUMENT 1 WITH MARKS

FIG. 15B — DOCUMENT 2 WITH MARKS

DOCUMENT 3 WITH MARKS

INFORMATION EMBEDDING AND RESOLVING METHOD AND APPARATUS

BACKGROUND OF THE INVENTION

1. Field of the Invention

The present invention generally relates to an information processing method, an information processing apparatus, an information printing process apparatus, and an information reproducing process apparatus. More specifically, the present invention is directed to such an information processing method/apparatus that after various types of information, for instance, document identifiers, explanatory descriptions related to documents, voice information, image information, and moving picture information, which have been registered in filing apparatuses, are printed on a medium such as paper in the mechanically recognizable forms, the printed information is read by using a compact reading apparatus, and then the relevant information is recognized from this read information to be reproduced in an optimized form with respect to this read information.

2. Description of the Related Art

Various printing systems have been proposed. For instance, when a document file is printed on a printing medium such as paper, various types of information (explanatory description, voice, image, moving picture, etc.) related to a certain portion of this document file is printed in an embedding manner with respect to the data of the document file. Thereafter, this printed medium is read-scanned to recognize the information which has been embedding-printed on the printed medium. Thus, the document file data printed together with the various types of information is retrieved, and also the explanatory descriptions are reproduced. As a typical conventional system, the following systems have been proposed:

(1) Japanese Patent Unexamined Publication No. Hei. 7-262216

This image information processing apparatus is such a filing apparatus that while a document on which the bar code has been printed is scanned, this scanned document image is displayed on a CRT. Also, since the bar code area within this displayed document image is designated by using a mouse or the like, this designated bar code area is judged as the bar code portion to decode/recognize the bar code. The decoded/recognized bar code is used as the document retrieve information.

(2) Japanese Patent Unexamined Publication No. Hei. 8-87562

This information storage apparatus is operated as follows. When the information is described on paper by using the bar code or the like, both the information to be recorded and the converting format information are inputted. This converting format information is to designate such a format used when this information is converted into the bar code. When the inputted converting format information is not correct, the decoding operation of the bar code is stopped.

(3) Japanese Patent Unexamined Publication No. Hei. 8-185533

This voice information processing apparatus is operated as follows. While establishing the correspondence relationship between the supplementary explanation information by way of voice and images as to the partial region within the document, and the region information indicative of the partial region of the main subject related to the supplementary explanation information, the supplementary explanation information and the region information are described within this document by employing either the bar code or the high-density two-dimensional bar code. When the supplementary explanation information and the region information are scanned/recognized, the partial region where the supplementary explanation information within this document is present is expressed in such a manner that there is such a supplementary explanation. When the partial region is selected, the explanatory information such as the voice and the image related to the partial region is reproduced. As the related art, the following patent publications are known: Japanese Patent Unexamined Publication No. Hei. 8-254987, Japanese Patent Unexamined Publication No. Hei. 8-255258, and Japanese Patent Unexamined Publication No. Hei. 8-314486.

(4) Japanese Patent Unexamined Publication No. Hei. 4-111140

In this multimedia document filing apparatus, the voice, the image, and the moving picture are coded. Then, the coded data are embedded into the document. Furthermore, when the coded data are embedded, the voice mark, the image mark, and the moving picture mark are printed together with the embedding data with maintaining a pre-selected positional relationship. Also, such mark data own the positional information of the data to be embedded. Such a document is scanned so as to detect the voice mark, the image mark, and the moving picture mark. Then, the positions of the embedded data can be specified from these detected marks to be decoded.

In the image information processing apparatus described in item (1) among the above-described conventional apparatuses, all areas of the document must be scanned so as to recognize the bar code area within the document to extract the retrieve information. The lengthy scanning time is required. Moreover, in order to recognize the bar code, the user himself is required to designate where the bar code is located within the image of the document. Therefore, the display/designation devices are required and further the designation time is needed.

Also, in the information storage apparatus described in item (2), the converting format information of the bar code is employed so as to secure the security of the information described in the bar code. However, a certain sort of information storage apparatus does not require such security, depending upon contents of information. Therefore, since the information storage apparatus always requires to enter the converting format information, the unnecessary entering works are needed and also this information storage apparatus owns less flexibility as to the requirement of security aspect. Moreover, in such a case that a plurality of pieces of information are described in a single bar code area, since the converting format information directly gives influences to the decoding process of the bar code, plural sorts of security cannot be applied, but only single security is allowed.

Also, in the voice information processing apparatus described in item (3), the supplementary explanation information of the partial region in the main subject, the region information for indicating that this supplementary explanation information corresponds to which part of the main subject, and further the relative information between the supplementary explanation information and the region information are separately described. Under such a circumstance, when a plurality of supplementary explanations are set within a single document, the user must designate which supplementary explanation should be referred among the plural supplementary explanations. To this end, the designation means is separately required as well as the image input apparatus.

In particular, in the embodiment of this conventional voice information processing apparatus, the entire document is scanned to input the overall image, and the information such as the bar code is recognized to extract the supplementary explanatory information and also the relative information between the supplementary explanatory information and the region information thereof. Then, based on the extracted information, for instance, a certain portion of the supplementary explanation is expressed by a specific mark on the document image displayed on the CRT. Then, this specific mark is checked so as to refer to the supplementary explanation. As a consequence, the user is necessarily required to refer to the paper document held on his hand, even on the CRT screen, resulting in very cumbersome works. In addition, this voice information processing apparatus additionally requires the CRT, the mark representing means for the supplementary explanation portion on the CRT, and the checking means for checking the mark-represented portion. Moreover, since the relative information is used to set which part of the main subject contains the supplementary explanation in the voice information processing apparatus, the user cannot grasp that which part contains the supplementary explanation until the main subject has been scanned.

Furthermore, in the multimedia document filing apparatus described in item (4), the mark is employed in order to discriminate the voice, the image, and the moving picture. There is no freedom degree in the marking position of this mark. For example, this mark cannot be marked on such a portion within the document where the supplementary explanation is desirably made. Furthermore, since the description position of the embedding information is specified by this mark, if this mark cannot be recognized properly due to adverse influence of noise, then the embedded data cannot be also reproduced.

As previously described, these conventional apparatuses own the following problems. The embedding information reproducing process cannot be commenced before the overall document has been scanned. Even when the embedding information reproducing process is commenced, the user must select the embedding information to be reproduced by employing the specific designating means. Therefore, unless the user can previously grasp the content and the sort of the embedding information, these apparatuses cannot be smoothly operated.

Also, in the conventional apparatus, the position of the embedding information and the need of the security cannot be changed, if required. Thus, the conventional apparatus cannot be smoothly operated, depending upon the user's requirement.

Furthermore, in the conventional apparatus, the original information embedded/printed in the document, namely the embedding information is expressed by using the specific ink and the magnetic materials. Therefore, this embedding information cannot be processed by employing the normal image input apparatus and the normal image output apparatus.

SUMMARY OF THE INVENTION

The present invention has been made to solve the above-described problems, and therefore, has an object to provide an information processing method and an information processing apparatus, capable of printing/reproducing embedding information by using the normal image input apparatus and the normal image output apparatus without employment of specific ink and also magnetic material.

Another object of the present invention is to provide an information processing method and an information processing apparatus, capable of reproducing embedding information in an optimum form by merely scanning a region of the embedding information, and smoothly operable even when a user does not grasp the content or sort of the embedding information.

A further object of the present invention is to provide an information processing method and an information processing apparatus, capable of changing the position of embedding information and the need of security, depending upon user's request, and operable with high flexibility.

To achieve the above-described objects, the present invention provides an information processing method comprising the steps of: inputting original information from an input apparatus; inputting attribute information of the original information; combining the original information with the attribute information in accordance with a correspondence relationship therebetween to thereby produce information to be embedded; producing embedding information from the information to be embedded; printing the embedding information on a recording medium; read-scanning the embedding information to thereby input image information; recognizing the embedding information from the inputted image information; resolving the recognized embedding information into the original information and the attribute information so as to determine an output apparatus used to reproduce the original information in accordance with the attribute information corresponding thereto; and outputting the original information to the output apparatus.

Further, the present invention provides an information processing apparatus comprising: information input means for inputting original information from an input apparatus; attribute information input means for inputting attribute information of the original information; information combining means for combining the original information with the attribute information in accordance with a correspondence relationship therebetween to thereby produce information to be embedded; embedding information producing means for producing embedding information from the information to be embedded; image output means for printing the embedding information on a recording medium; image input means for read-scanning the embedding information to thereby input image information; embedding information recognizing means for recognizing the embedding information from the inputted image information; information resolving means for resolving the recognized embedding information into the original information and the attribute information so as to determine an output apparatus used to reproduce the original information in accordance with the attribute information corresponding thereto; and information output means for outputting the original information to the output apparatus.

Further, the present invention provides an information processing apparatus comprising: information input means for inputting original information from an input apparatus; attribute information input means for inputting attribute information of the original information; information combining means for combining the original information with the attribute information in accordance with a correspondence relationship therebetween to thereby produce information to be embedded; embedding information producing means for producing embedding information from the information to be embedded; and image output means for printing the embedding information on a recording medium.

Furthermore, the present invention provides an information processing apparatus comprising: image input means for read-scanning embedding information printed on a medium to thereby input image information; embedding information recognizing means for recognizing the embedding information from the inputted image information; information resolving means for resolving the recognized embedding information into the original information and the attribute information so as to determine an output apparatus used to reproduce the original information in accordance with the attribute information corresponding thereto; and information output means for outputting the original information to the output apparatus.

BRIEF DESCRIPTION OF THE DRAWINGS

FIGS. 15(a) to 15(c) are illustrations of print results produced from the information printing process apparatus of FIG. 13;

DETAILED DESCRIPTION OF THE PREFERRED EMBODIMENTS

Referring now to the accompanying drawings, various embodiments of the present invention will be described in detail.

Figure 1:
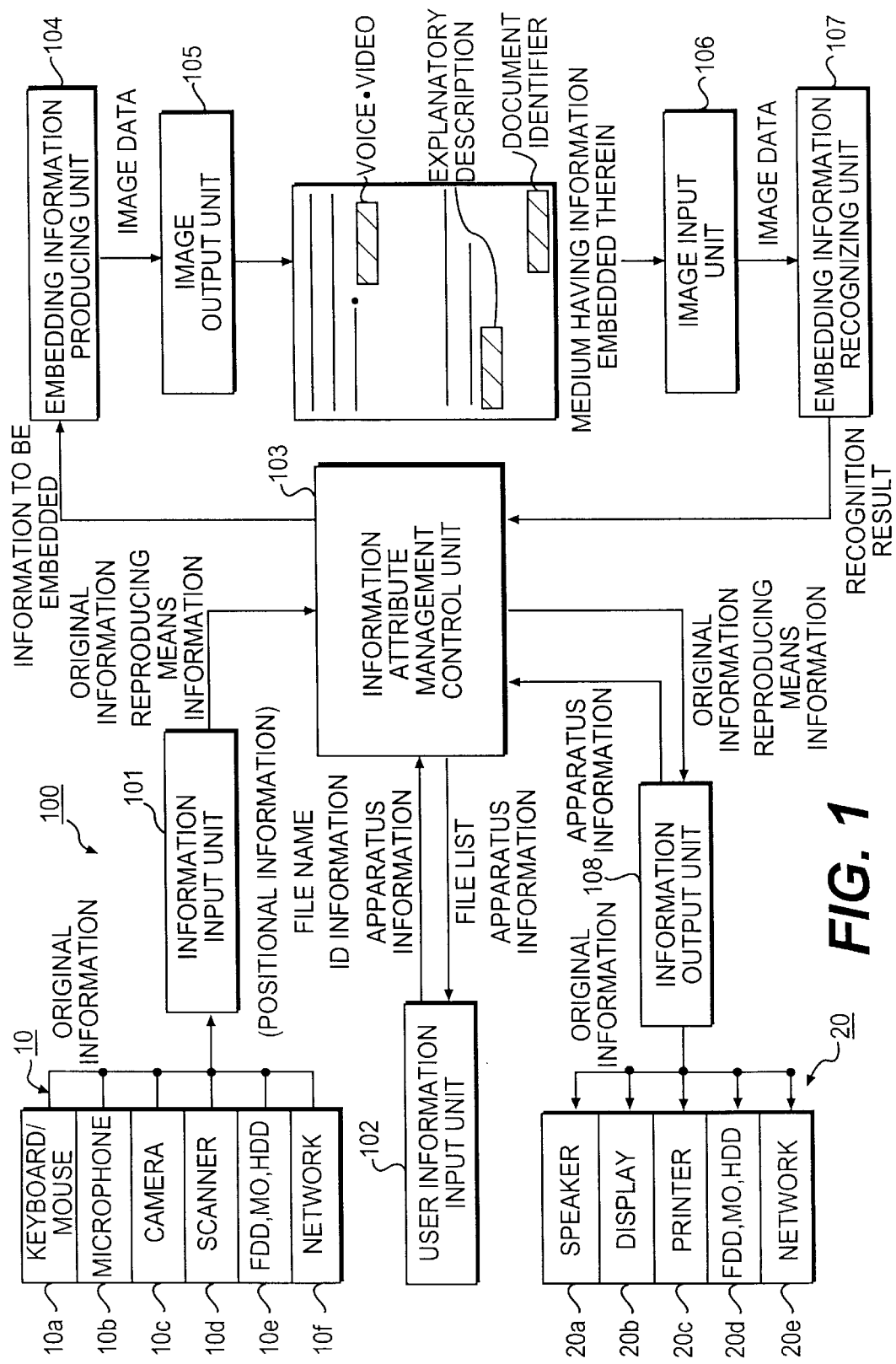
FIG. 1 is a schematic block diagram showing a functional arrangement of an information processing apparatus according to a first embodiment of the present invention.

FIG. 1 is a schematic block diagram showing a functional arrangement of an information processing apparatus 100 according to a first embodiment of the present invention. This information processing apparatus 100 is arranged by an information input unit 101 for entering information from an input apparatus 10 as original information; a user information input unit 102 for entering attribute information related to the original information as user information, if necessary; and an information attribute management control unit 103 for managing the attributes of the input information. That is, this information attribute management control unit 103 sorts the original information entered from the information input unit 101 in relation to the attribute information entered from the user information input unit 102, and also sorts recognized embedding information into original information and attribute information based upon recognition results entered from an embedding information recognizing unit 107 (which will be discussed later).

The information processing apparatus 100 is further arranged by an embedding information producing unit 104 for converting the information to be embedded sent out from the information attribute management control unit 103 into actually printed image data (embedding information: bar code data, griff data and the like being used) as one of the process operations based on the above-described attribute management; an image output unit 105 for printing the above-described image data as embedding information on a medium such as paper in the form of a bar code and a griff; and an image input unit 106 for read-scanning an embedding information print region on the medium to input image data. The information processing unit 100 is further arranged by an embedding information recognizing unit 107 for recognizing embedding information from the image data entered from the image input unit 106; and also an information output unit 108 for outputting original information to an output apparatus 20 selected based on the attribute management by the information attribute management control unit 103 with respect to the recognition result.

In this information processing apparatus 100, as the input apparatus 10 capable of inputting the original information via the information input unit 101, the following input devices may be employed. That is, there are an information input appliance 10a such as a keyboard and a mouse; a microphone 10b; a camera 10c; a scanner 10d; an information storage medium 10e such as a floppy disk drive (FDD), a magneto-optical disk (MO), and a hard disk drive (HDD); and a network 10f and the like. Also, as the output apparatus 20 capable of reproducing the original information via the information output unit 108, there are a speaker 20a; a display 20b; a printer 20c; an information storage medium 20d such as an FDD, an MD, and an HDD; and a network 20e and the like.

As shown in FIG. 1, the overall arrangement of this information processing apparatus 100 is mainly subdivided into a printing process unit mainly constituted by the above-described information input unit 101, the embedding information producing unit 104, and the image output unit 105; and also into a scanning/recognizing process unit mainly constructed by the above-described image input unit 106 and the embedding information recognizing unit 107.

In the first embodiment, both the above-described printing process unit and scanning/recognizing process unit are arranged by commonly employing the information attribute management control unit 103. As one of concrete structures of these printing process unit and scanning/recognizing process unit, for instance, a normal printer apparatus may be employed as the printing process unit, whereas a handheld scanner may be employed as the scanning/recognizing process unit. Alternatively, in this first embodiment, both a handheld printer corresponding to the printing process unit and a handheld scanner corresponding to the scanning/recognizing process unit may be arranged in an integral structure. As one concrete example of this integral-body-type structure, such a pen-type structure may be employed, one end of which may function as a printing unit (corresponding to the image output unit 105) of the handheld printer, and the other end of which may function as a reading unit (corresponding to the image input unit 106) of the handheld scanner. Also, in this alternative case, the above-described input apparatus 10 and output apparatus 20 may be assembled into the pen-type structure.

A description will now be made of operations of the information processing apparatus 100 according to the first embodiment of the present invention. It should be understood in the following description that both the printing process unit and the scanning/recognizing process unit are arranged in the form of the above-described pen-type structure.

Figure 4:
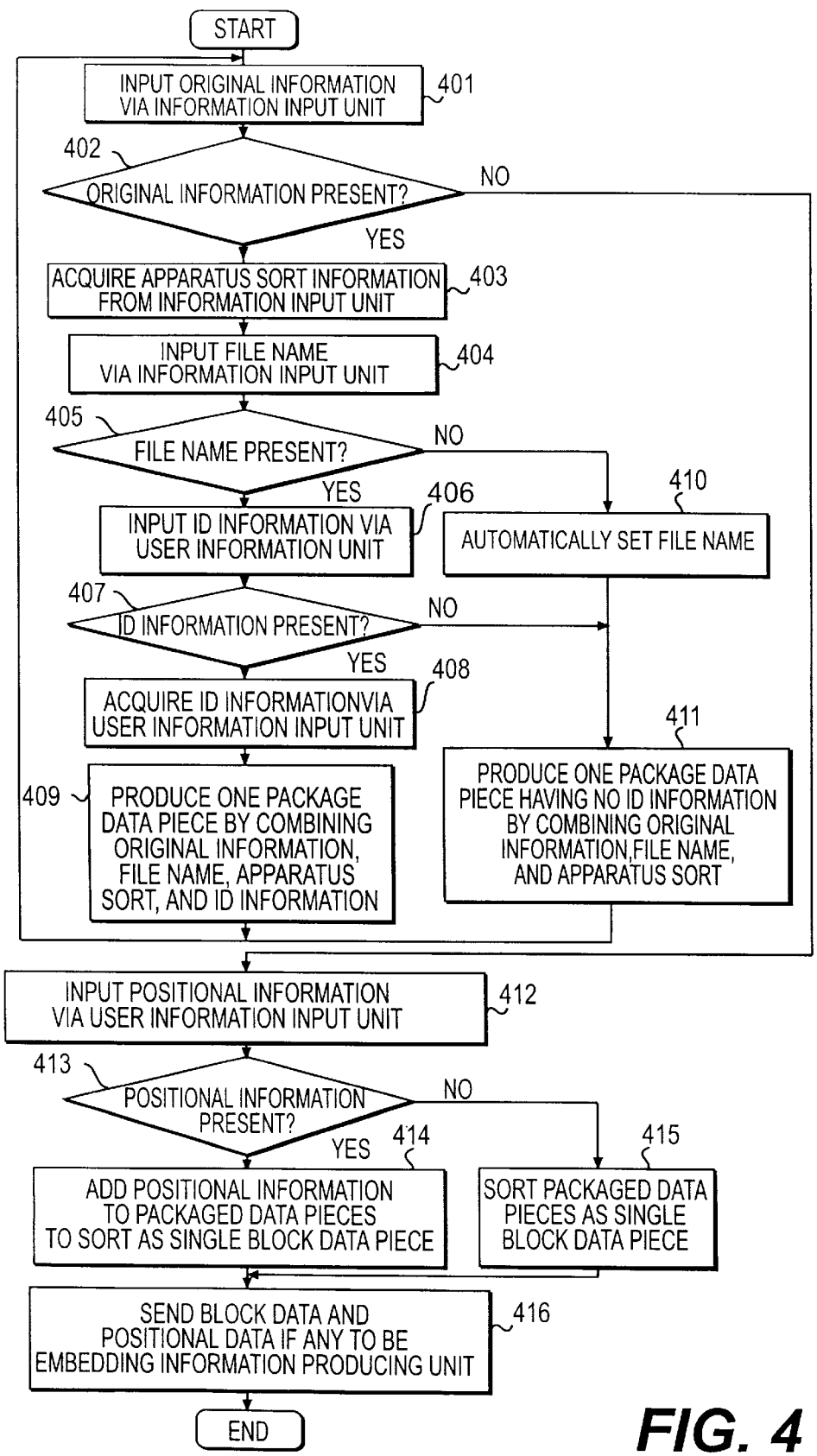
FIG. 4 is a flow chart for describing a process operation by the information attribute management control unit during a printing operation by the information processing apparatus of FIG. 1.

In this case, for instance, a printing process operation of embedding information is executed by the information processing apparatus 100 in accordance with a flow chart indicated in FIG. 4. When the embedding information is printed, a user firstly enters original information which is wished to be embedded, or buried via the information input unit 101 from the input apparatus 10 such as the keyboard/mouse 10a, the microphone 10b, the camera 10c, the scanner 10d, the FDD/MO/HDD 10e, and the network 10f. At this time, the information input unit 101 notifies an apparatus type of such an input apparatus 10 used to enter the original information to the information attribute management control unit 103 in combination with the above-described original information. Alternatively, in such a case that both the input apparatus 10 and the output apparatus 20 (reproducing means) are set in correspondence with each other, this apparatus type may be replaced with information of the reproducing means.

Also, if required, when the original information is entered from the input apparatus 10, the user enters such information as a file name, identification information, and apparatus information as the attribute information related to the original information by using the user information input unit 102. Furthermore, the user may enter positional information indicative of a position where the above-described embedding information is embedded by employing the user information input unit 102, if needed.

In response to this information input operation by the user, the information attribute management control unit 103 inputs the original information via the information input unit 101 (step 401), and judges as to whether or not the original information is present (step 402). If the original information is present (YES at step 402), then the information attribute management control unit 103 acquires the apparatus type information (information of reproducing means) notified from the information input unit 101 in connection with this original information (step 403).

Next, the information attribute management control unit 103 enters a file name among the attribute information related to the above-described original information via the user information input unit 102 (step 404), and then checks as to whether or not the file name is present (step 405). At this step, when the file name is present (YES at step 405), the information attribute management control unit 103 inputs identification information via the user information input unit 102 (step 406), and then judges as to whether or not the identification information is present (step 407).

If the identification information is present (YES at step 407), then the information attribute management control unit 103 acquires the identification information via the user information input unit 102 (step 408) to produce one package data piece by combining the above-described original information, apparatus type, file name, and identification information with each other, which have been acquired at previous steps 401, 403, 404, and 406 (step 409).

Conversely, when the file name is not present in the above-described process operation (NO at step 405), the information attribute management control unit 103 automatically sets a file name corresponding thereto (step 410). Thereafter, when it is so judged at step 407 that the identification information is not present, the information attribute management control unit 103 combines the original information, the apparatus type, and the file name with each other which have been acquired at steps 401, 403, and 405 to thereby produce one package data piece having no identification information (step 411).

Subsequently, in such a case that a plurality of pieces of original information should be produced, the process operations defined at steps 401 to 411 are executed respectively plural times equal to the number of pieces of original information.

When the input operation of the above-described original information is ended (NO at step 402), the information attribute management control unit 103 inputs the positional information used to embed the original information via the user information input unit 102 (step 412), and then checks as to whether or not the positional information is present (step 413). It should be noted that the positional information may be entered with respect to each piece of the original information entered at step 401.

In the case that the positional information is present (YES at step 413), the information attribute management control unit 103 inserts the positional information into one or a plurality of data pieces contained in the package data produced at step 409 or 411, in order to sort these data pieces as a single block data piece (step 414).

Conversely, when the positional information is not present (NO at step 413), the information attribute management control unit 103 sorts the data contained in the package data produced at step 409 or 411 as a single block data piece having no positional information (step 415).

Figure 2:
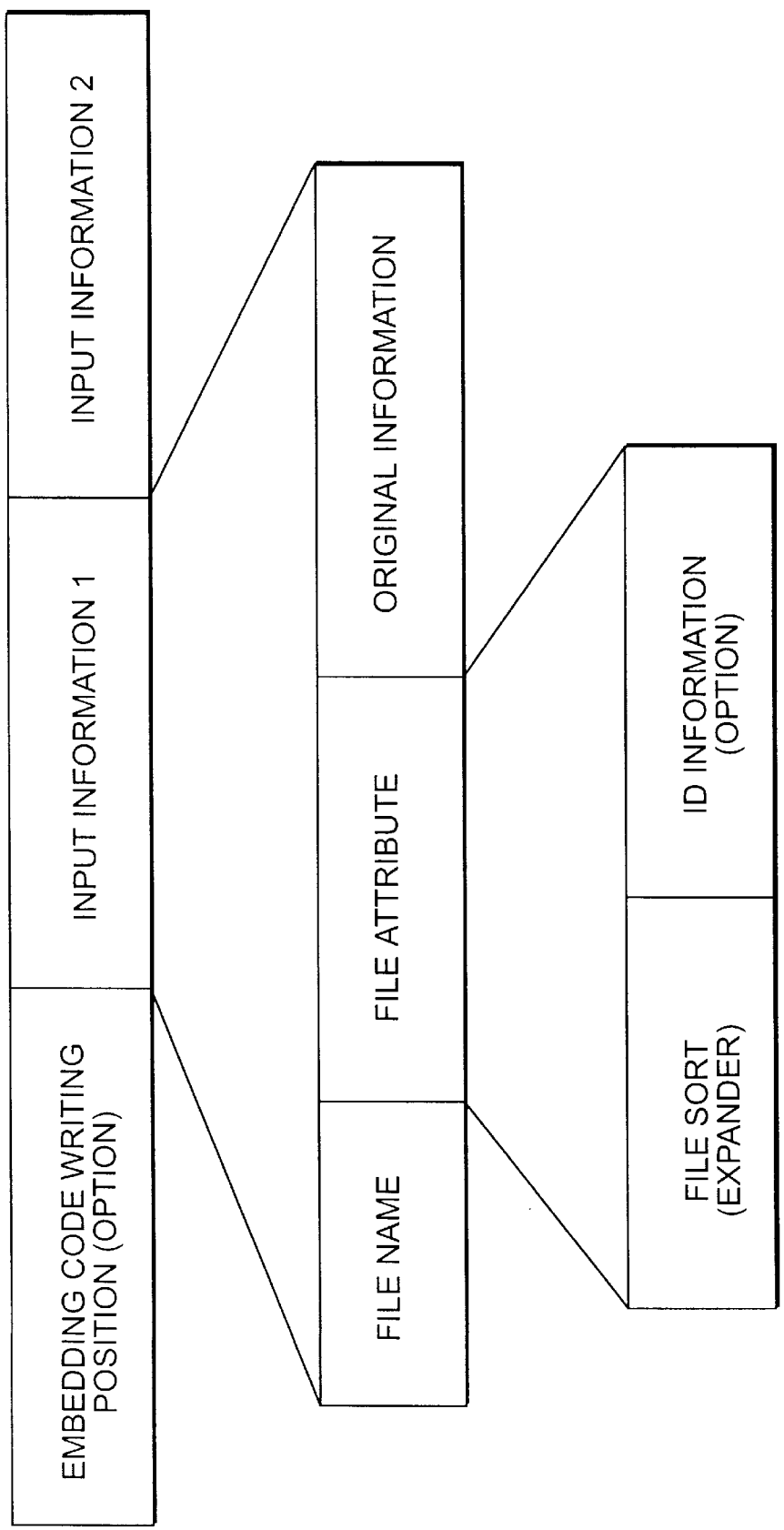
FIG. 2 is a diagram showing an example of a format of the information to be embedded produced in an information attribute management control unit employed in the information processing apparatus of FIG. 1.

FIG. 2 illustrates an example of a frame structure of the block data sorted by the process operations defined at steps 414 and 415. As shown in FIG. 2, this frame structure is constituted by that an embedding code writing position is present at a head portion as an option, and a plurality of input information pieces 1, 2, 3, . . . , which have been entered by the respective process operations are successively arranged. The contents of each input information piece are made of the file name, the file attribute, and the original information. Furthermore, a file type (expander) is inserted into the file attribute. This file type indicates information for representing a type (voice, video, image, text, identifier, Internet address, and so on) of corresponding original information. Also, identification information is inserted as an option.

The information attribute management control unit 103 transmits the block data produced at step 414 or 415 as the information to be embedded to the embedding information producing unit 104. At this time, if positional information is present, then this positional information is sent out in combination with the block data (step 416).

Figure 5:
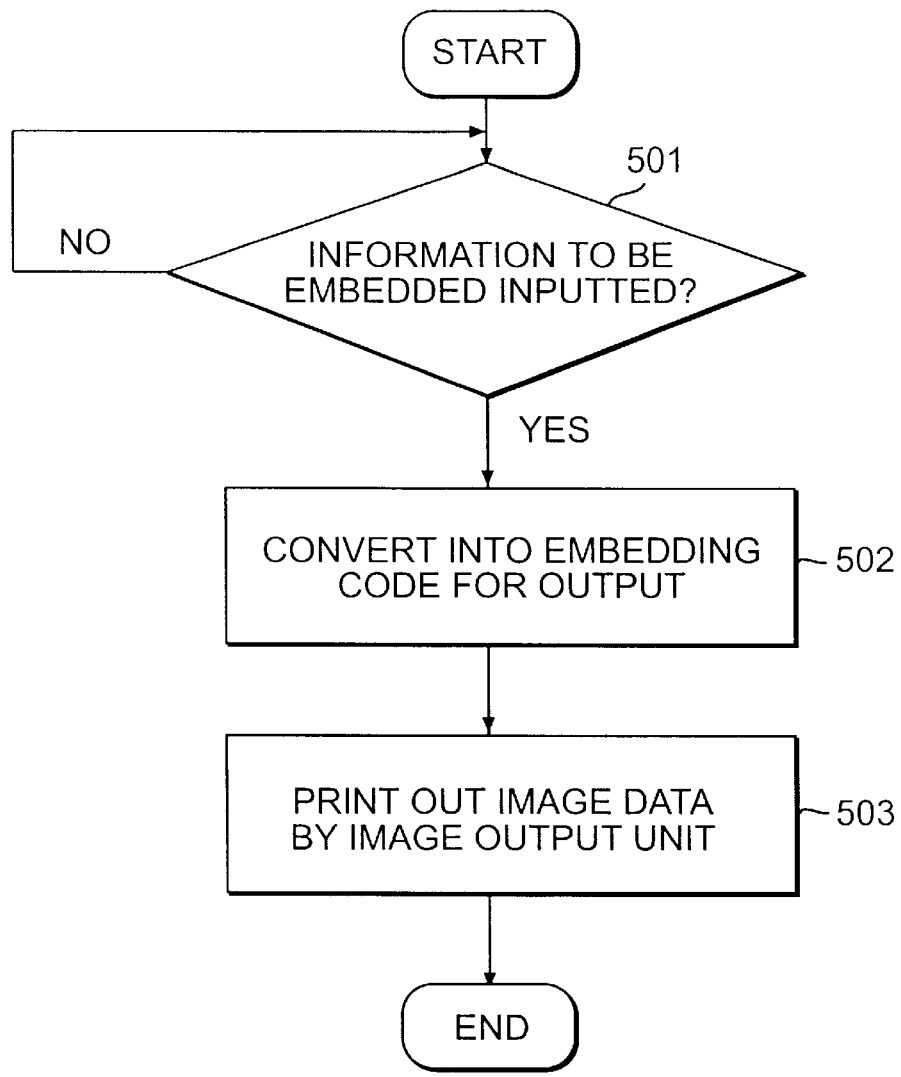
FIG. 5 is a flow chart for describing a process operation by an embedding information producing unit and an image output unit during the printing operation by the information processing apparatus of FIG. 1.

The embedding information producing unit 104 and the image output unit 105 perform a printing process operation defined in a flow chart shown in FIG. 5 with respect to the block data sent from the information attribute control unit 103 in the above-described manner. First, after the embedding information producing unit 104 receives the above-described information to be embedded (YES at step 501), the embedding information producing unit converts this information to be embedded into an actual embedding code, and then sends this actual embedding code as image data to the image output unit 105 (step 502). The image output unit 105 prints out the image data on a print medium such as paper as embedding information. At this time, a printing position is designated in such a manner that the user actually positions the image output unit 105 at a desirable write-in position on the print medium (step 503).

For example, as shown in FIG. 1, the original information entered from the input apparatus 10 can be printed as the embedding information on the printable medium such as paper by the above-described printing process operation. This embedding information corresponds to the voice information, the video information, the explanatory description (text), or the document identifier based on the original information entered from the input apparatus 10. In particular, in this example, since the handheld printer is employed, the embedding position of the embedding information may be determined at an arbitrary position where the image output unit 105 is attached.

It should also be noted that when the normal printer is employed so as to input the original information, the user enters the positional information of the embedding position of the original information. The information attribute management control unit 103 produces the block data (see FIG. 2) into which the positional information is inserted, and then supplies the block data as the information to be embedded to the embedding information producing unit 104. At above-described step 502, the embedding information producing unit 104 recognizes the positional information contained in the information to be embedded, and executes a layout process of an embedding region for the embedding code in accordance with the positional information. The image output unit 105 prints out the embedding information on the above-described embedding region.

Referring now to a flow chart of FIG. 6, a description will be made of a scanning/recognizing process operation for the printed embedding information in the information processing apparatus 100. Since the handheld scanner is employed in this example, when the embedding information printed on the medium is reproduced, the user scans the embedding information region while attaching the image input unit 106 onto the embedding information region. In particular, in the case that a plurality of embedding information pieces are printed in a plurality of regions on a print medium, the user may select embedding information belonging to which region for recognition based on his will, and scans the selected embedding information region while attaching the image input unit 106 to the selected embedding information.

In accordance with the above-described scanning operation, in the image input unit 106, image data corresponding to one or a plurality of embedding information pieces is produced, and then is supplied to the embedding information recognizing unit 107. The embedding information recognizing unit 107 executes the recognition process of the image data entered from the image input unit 106. As a result, after all of the embedded information pieces are extracted, the embedding information recognizing unit 107 supplies the extracted result to the information attribute management control unit 103.

Figure 6:
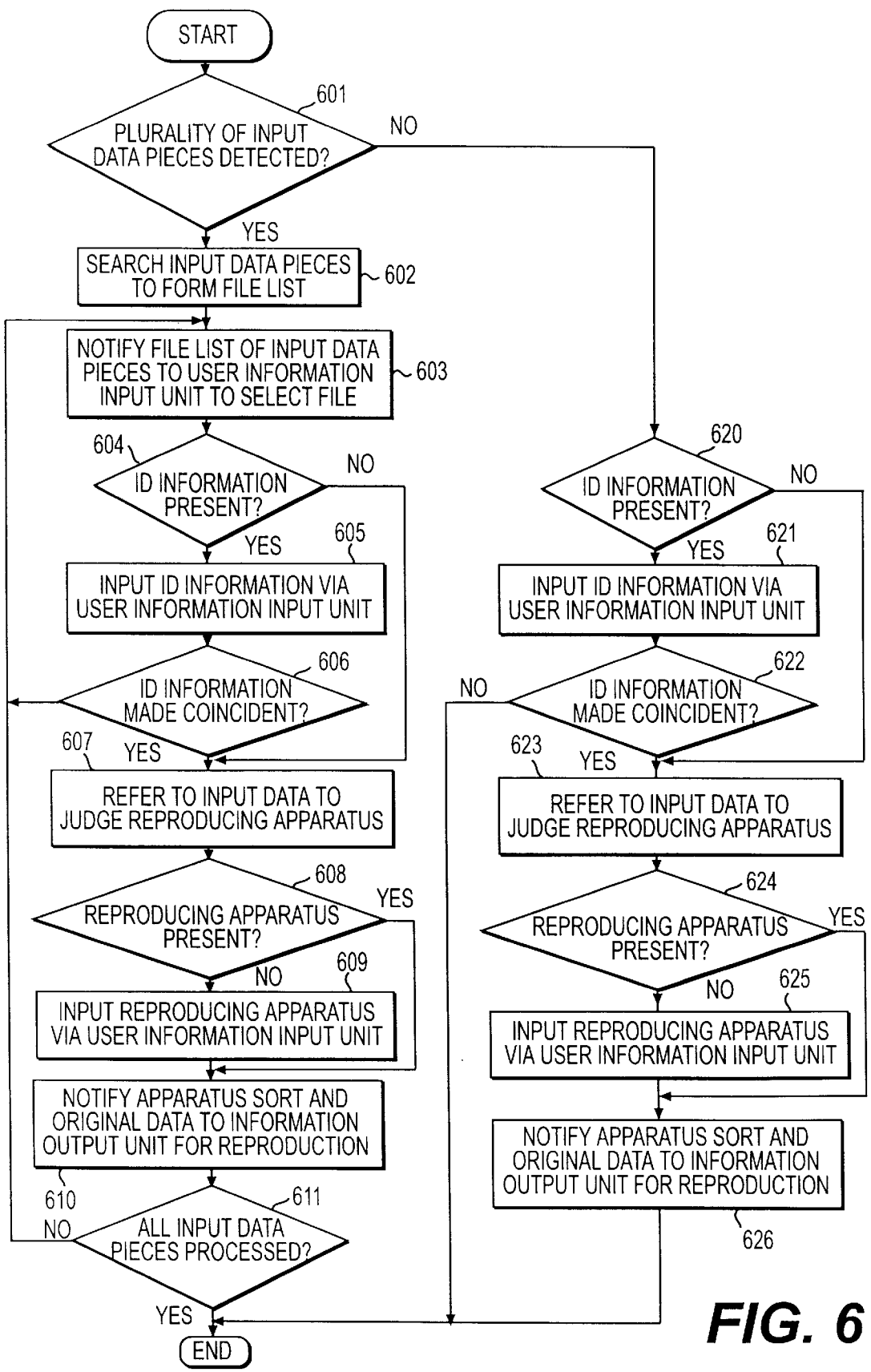
FIG. 6 is a flow chart for describing an embedding information reproducing process operation by the information processing apparatus of FIG. 1.

The information attribute management control unit 103 executes a reproducing process operation as defined in a flow chart shown in, for instance, FIG. 6, based upon the above-described extracted result. First, the information attribute management control unit 103 analyzes the data (namely, recognized results) extracted by the embedding information recognizing unit 107, and then extracts the respective data pieces in accordance with the format shown in FIG. 2. Then, the information attribute management control unit 103 classifies and sorts the extracted data pieces.

Next, the information attribute management control unit 103 judges as to whether or not there are a plurality of input data pieces, namely embedded original information pieces, based upon the above-described classified/sorted results (step 601). When a plurality of input data pieces are present (YES at step 601), the information attribute management control unit 103 retrieves the input data pieces so as to form a file table (file list) of the input data pieces (step 602). Subsequently, this file list of the input data pieces is displayed via the user information input unit 102 to the user, so that the user may be prompted to select which input data piece (original information) is reproduced. In response to this user's selection, such original information designated by the user through the user information input unit 102 is selected as information to be reproduced (step 603). It should also be noted that as the method for selecting the original information by the user, the file name may be entered from the user information input unit 102, and a wild card may be designated in addition to the above-described original information selected from the file list.

Furthermore, in the case that the identification information is added to the original information selected at step 603 (YES at step 604), the information attribute management control unit 103 prompts the user to input the identification information via the user information input unit 102, and also acquires the entered identification information in response to this request (step 605). Then, the information attribute management control unit 103 judges as to whether or not both of the identification information are made coincident with each other (step 606).

When the identification information entered from the user information input unit 102 is not made coincident with the identification information added to the original information (NO at step 606), the process operation of the previously selected file is interrupted, and then the control is returned to a next file selection process operation (step 603). To the contrary, when the identification information entered from the user information input unit 102 is made coincident with the identification information added to the original information (YES at step 606), while referring to the attribute information of the previously selected file, a judgement is made of the output apparatus 20 for reproducing the file (step 607). This judgement may be carried out with reference to an expander of a file type (namely, apparatus type) among attribute information to be inserted into, for example, the above-described selected file (input data (original information)).

Next, the information attribute management control unit 103 interrogates the information output unit 108 as to whether or not the output apparatus 20 judged as the reproducing means is connected thereto (step 608). When this interrogated output apparatus 20 is connected (YES at step 608), the information attribute management control unit 103 sends out the apparatus type of the output apparatus 20 judged at step 607 and the original information corresponding thereto to the information output unit 108. Then, in the information output unit 108, a control operation for reproducing the above-described original information is carried out by the output apparatus 20 corresponding to the apparatus type (step 610).

On the other hand, in the case that the output apparatus 20 judged as the reproducing means is not connected (NO at step 608), the user enters the output apparatus 20 functioning as the reproducing means through the user information input unit 102 (step 609). Subsequently, the information attribute management control unit 103 sends out the entered apparatus type of the output apparatus 20 and the entered original information to the information output unit 108. Then, in the information output unit 108, a control operation for reproducing the above-described original information is carried out by the output apparatus 20 corresponding to the apparatus type (step 610). It should be noted that the process operation defined at step 609 may be replaced by a method for automatically selecting a predetermined output apparatus 20. In this alternative case, for instance, such a process operation may be conceived that the above-described selected original information is stored in the hard disk unit (20d).

Thereafter, the information attribute management control unit 103 monitors as to whether or not all of the input data have been processed (step 611). When there is input data which has not yet been processed (NO at step 611), the process operations defined at steps 603 to 611 are repeatedly performed until all of the input data pieces are processed (YES at step 611). In such a case that a wild card is designated when the file selection is carried out in the user information input unit 102, the file (original information) selection at step 603 may be automatically performed by the system to repeatedly perform the process operations defined at steps 603 to 611. Also, in such a case that the input data (original information) is a single piece (NO at step 601), the information attribute management control unit 103 executes process operations defined at steps 620 to 626, which are similar to the above-described process operations defined at steps 604 to 610 with respect to such a case that a plurality of input data pieces are present.

Figure 3:
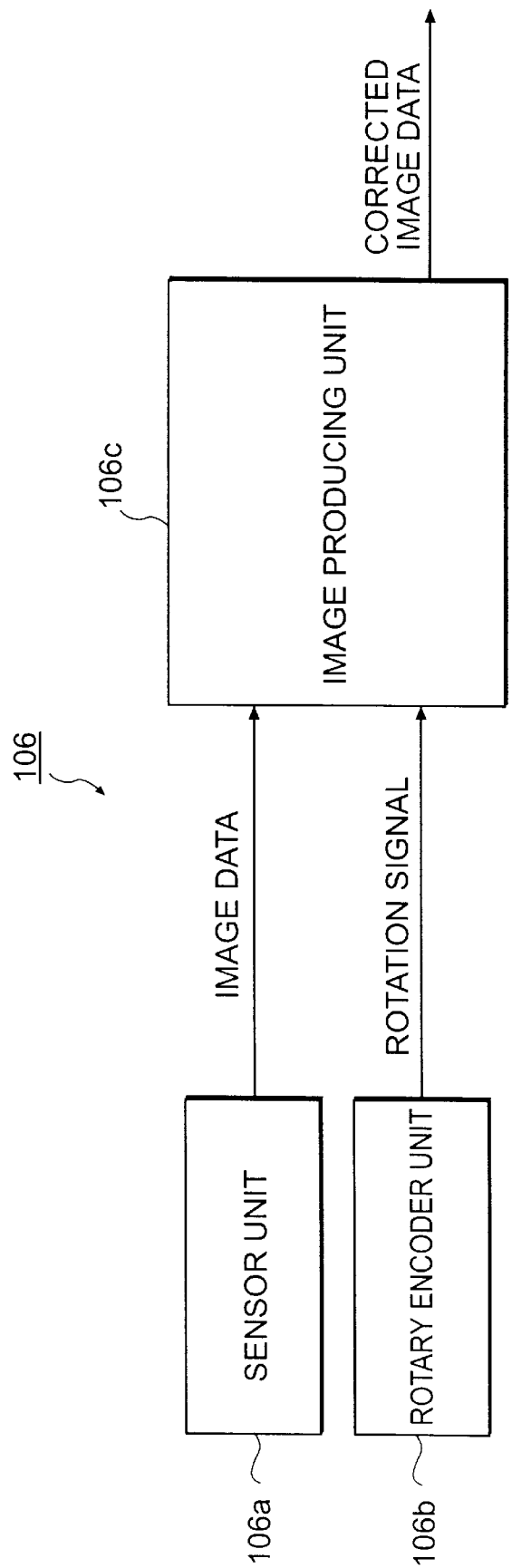
FIG. 3 is a conceptional diagram showing a structural example of an information input unit employed in the information processing apparatus of FIG. 1.

It should be understood that the above-described information processing apparatus may be modified as follows. That is, as indicated in FIG. 3, a rotary encoder unit 106b is added to the image input unit 106, and image data acquired from the sensor unit 106a is corrected by utilizing the rotation signal derived from the rotary encoder unit 106b in the image producing unit 106c in order that while the scanning operation is carried out in the image input unit 106, even when, for instance, a rectangular embedding information region on a medium is scanned along either a right direction or a left direction, correct image can be obtained. Also, the image input unit 106 may be realized by employ the following apparatus. For example, while an apparatus such as a digital camera or a video camera is employed, a subject is photographed at a position separated from several tens of cm to several meters, so that image data containing an embedding information region is produced. Furthermore, as another example of the image input unit 106, while a non-contact-type scanner such as a laser scanner is used, image data containing an embedding information region is produced.

Next, an applied example of the information processing apparatus 100 will now be described. As previously described, in the embodiment, the printing process unit and the scanning/recognizing process unit can be arranged in an integral form as, for instance, a handheld printer and a handheld scanner. In this structural case, the information scanned to be recognized by the handheld scanner is again encoded, so that the encoded information may be directly printed out by the handheld printer.

Figure 7:
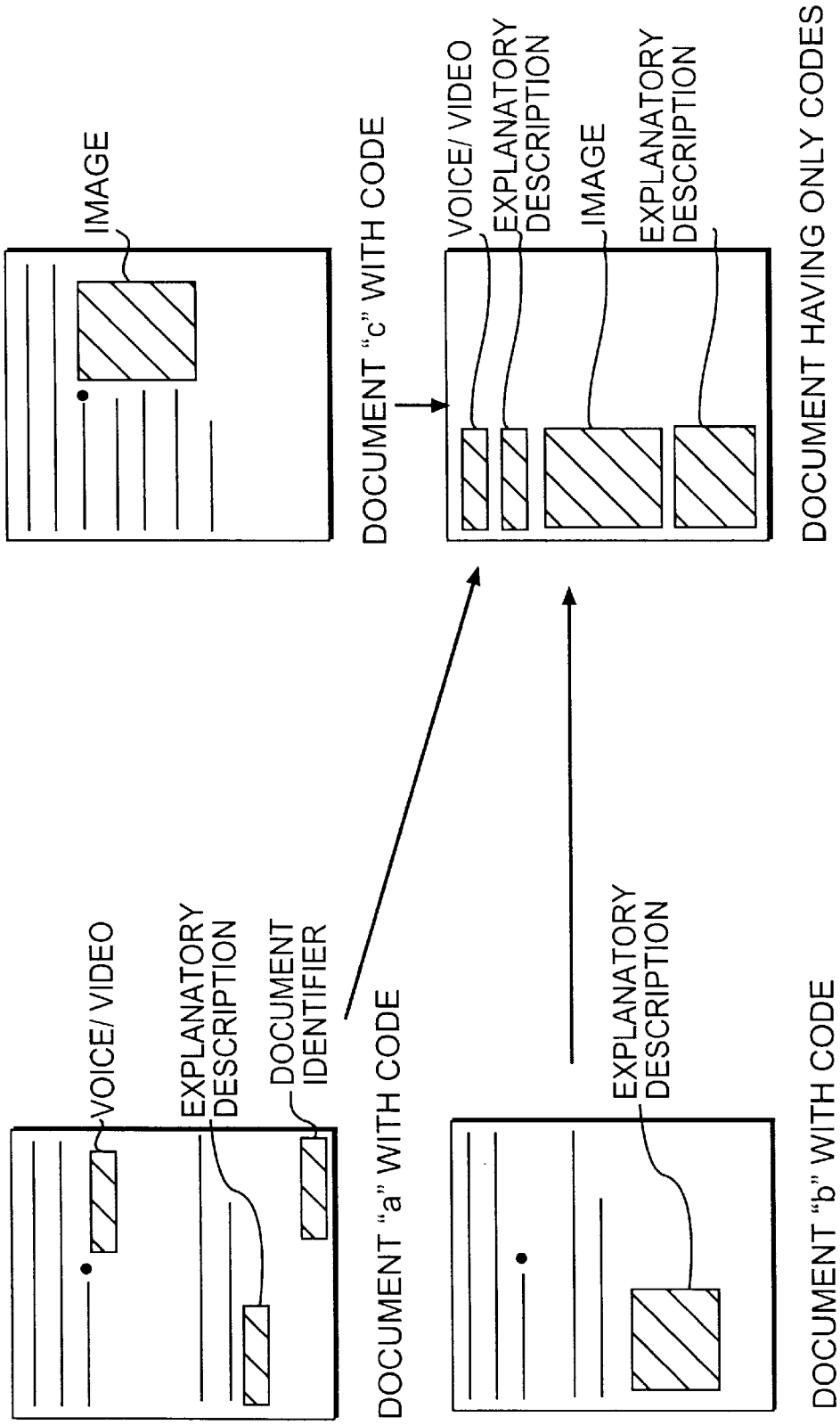
FIG. 7 is an illustration of operation images of a modified image processing apparatus according to the first embodiment.

FIG. 7 illustratively shows an operation image of the information processing apparatus 100 additionally equipped with this function. In this operation, while an embedding code region constructed of voice/video signals, and also an embedding code region constructed of an explanatory description on a document "a" having an embedding code are scanned by the handheld scanner, recognition results of the embedding codes are saved. Also, while an embedding code region constructed of an explanatory description on another document "b" having an embedding code, and furthermore, an embedding code region constructed of an image on another document "c" having an embedding code are scanned respectively by the handheld scanner, recognition results of the embedding codes are saved. Thereafter, these recognition results are again encoded, and the encoded recognition results are printed by the handheld printer on the respective positions of another paper to form a document by collecting only the embedding codes.

Figure 8:
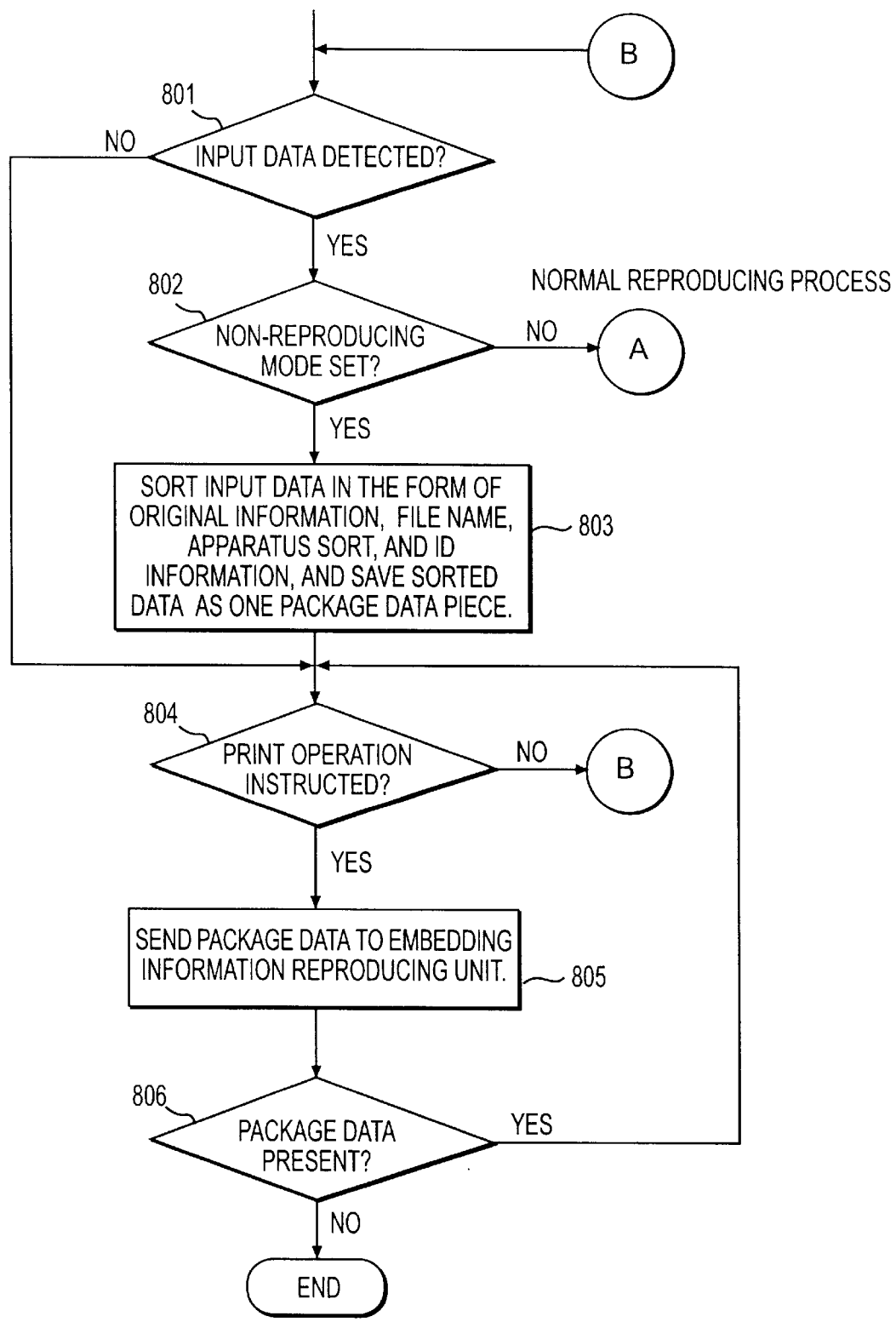
FIG. 8 is a flow chart for describing a process operation by the modified image processing apparatus of FIG. 7.

FIG. 8 is a flow chart for describing a process operation of the information processing apparatus 100 during this operation. First, image data is entered from the image input unit 106 by the scanning operation of the handheld scanner, and the recognition result for this input image data by the embedding information recognizing unit 107 is transferred to the information attribute management control unit 103. Upon detection of the input data supplied from the embedding information recognizing unit 107 (step 801), the information attribute management control unit 103 judges as to whether or not a non-reproducing mode is set (step 802). In the case that the non-reproducing mode is not set (NO at step 802), the control is advanced to the normal reproducing process operation (see FIG. 6). To the contrary, in such a case that the non-reproducing mode is set (YES at step 802), the above-described input data is sorted in the form of the original information, the file name, the apparatus sort, and the identification information, and then the sorted data are saved as one package data piece (see FIG. 2) (step 803).

Next, the information attribute management control unit 103 judges as to whether or not a print operation has been instructed (step 804). When no print operation has been instructed (NO at step 804), the control is advanced to the recognizing process operation for the next input data. Conversely, when the print operation has been instructed (YES at step 804), one of the package data pieces under save state is sent as information to be embedded to the embedding information producing unit 104 (step 805). In the embedding information producing unit 104, embedding information is produced by using the above-described information to be embedded. In the image output unit 105, this embedding information is printed at a position of a medium, to which the image output unit 105 is attached. Thereafter, the information attribute management control unit 103 judges as to whether or not other package data pieces are still left (step 806). If there are such remaining package data pieces (YES at step 806), then the control is returned to the print instruction waiting condition (step 804). Conversely, when there is no remaining package data piece (NO at step 806), the process operation is ended.

Figure 9:
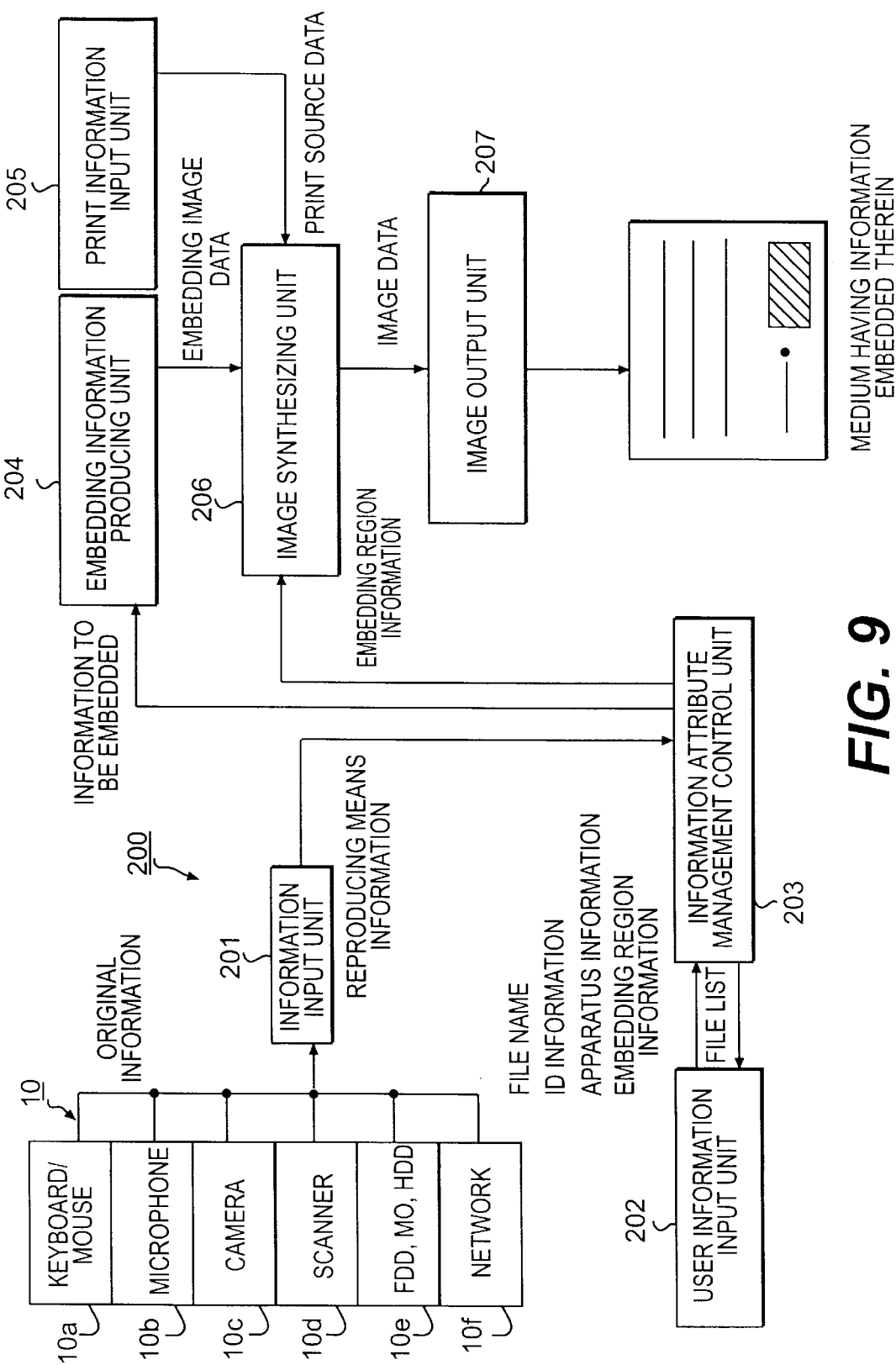
FIG. 9 is a schematic block diagram showing a functional arrangement of an information printing process apparatus according to a second embodiment of the present invention.
Figure 10:
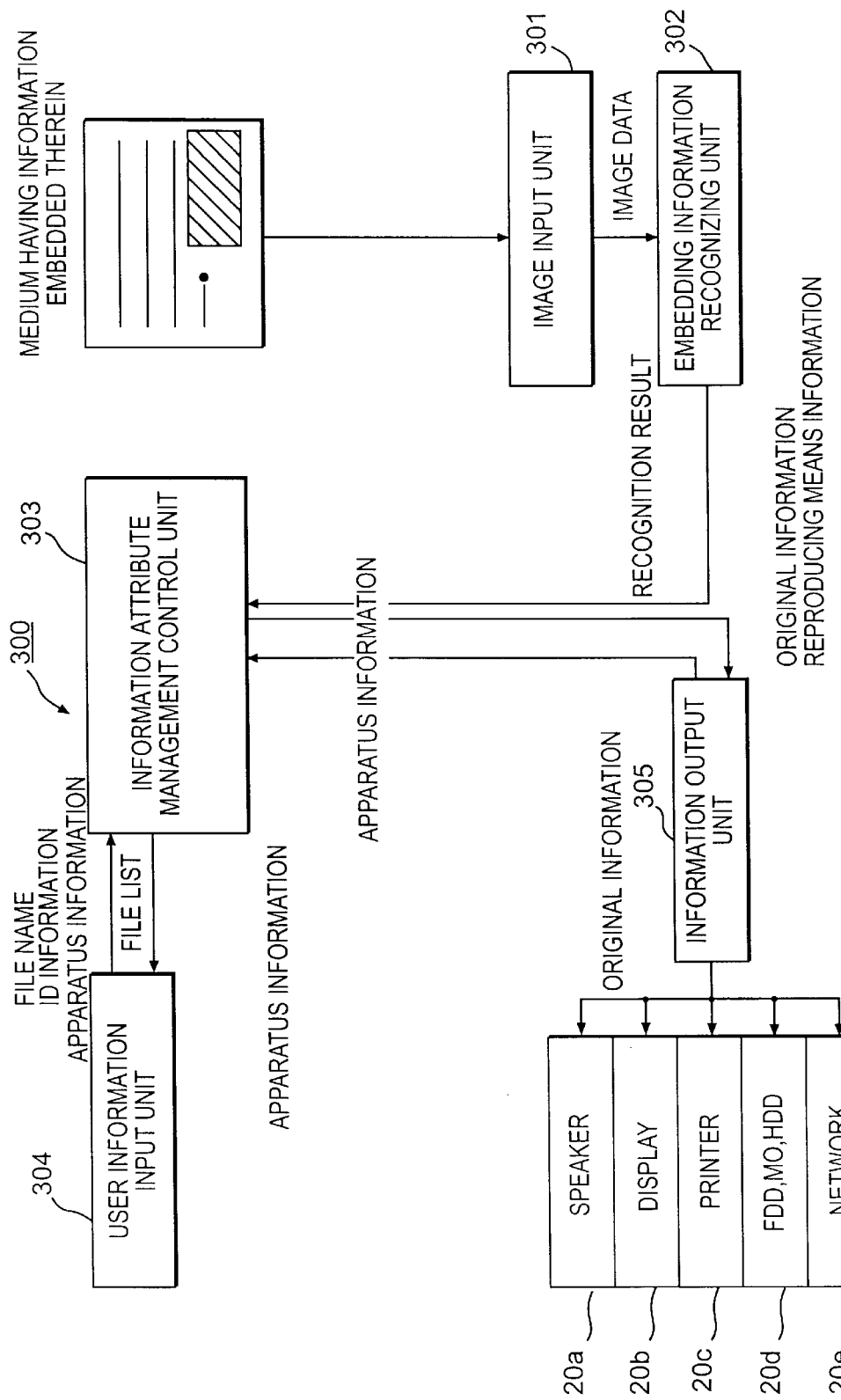
FIG. 10 is a schematic block diagram showing a functional arrangement of an information reproducing process apparatus according to the second embodiment.

Now, a second embodiment of the present invention will be described. FIGS. 9 and 10 are block diagrams showing functional arrangements of information printing/reproducing apparatuses 200 and 300 according to the second embodiment of the present invention. It should be noted that in the above-described information processing apparatus 100 according to the first embodiment, the printing process unit and the scanning/recognizing process unit are constituted in the form of the integral body, whereas in the apparatus according to the second embodiment, a printing process unit is separately provided with a scanning/recognizing process unit. In other words, in the second embodiment, the information printing process apparatus 200 shown in FIG. 9 and the information reproducing process apparatus 300 shown in FIG. 10 are completely separated from each other. For instance, the information printing process apparatus 200 may be realized by a normal printer apparatus, whereas the information reproducing process apparatus 300 may be realized by a handy scanner.

As shown in FIG. 9, the information printing process apparatus 200 is arranged by an input apparatus 20, an information input unit 201, a user information input unit 203, an information attribute management control unit 204, an embedding information producing unit 204, and an image output unit 207, which own the equivalent functions as the respective units employed in the information processing apparatus 100 according to the first embodiment. This information printing process apparatus 200 is further arranged by a print information input unit 205 for inputting print source data corresponding to a destination where original information is embedded, and an image synthesizing unit 206 for synthesizing the print source data with embedding information (image data) derived from the embedding information producing unit 204. On the other hand, the information reproducing process apparatus 300 indicated in FIG. 10 is arranged by an image input apparatus 301, an embedding information recognizing unit 302, a information attribute management control unit 303, an user information input unit 304, an information output unit 305, and an output unit 20, which own the equivalent functions as the respective units employed in the information processing apparatus 100 according to the first embodiment.

Figure 11:
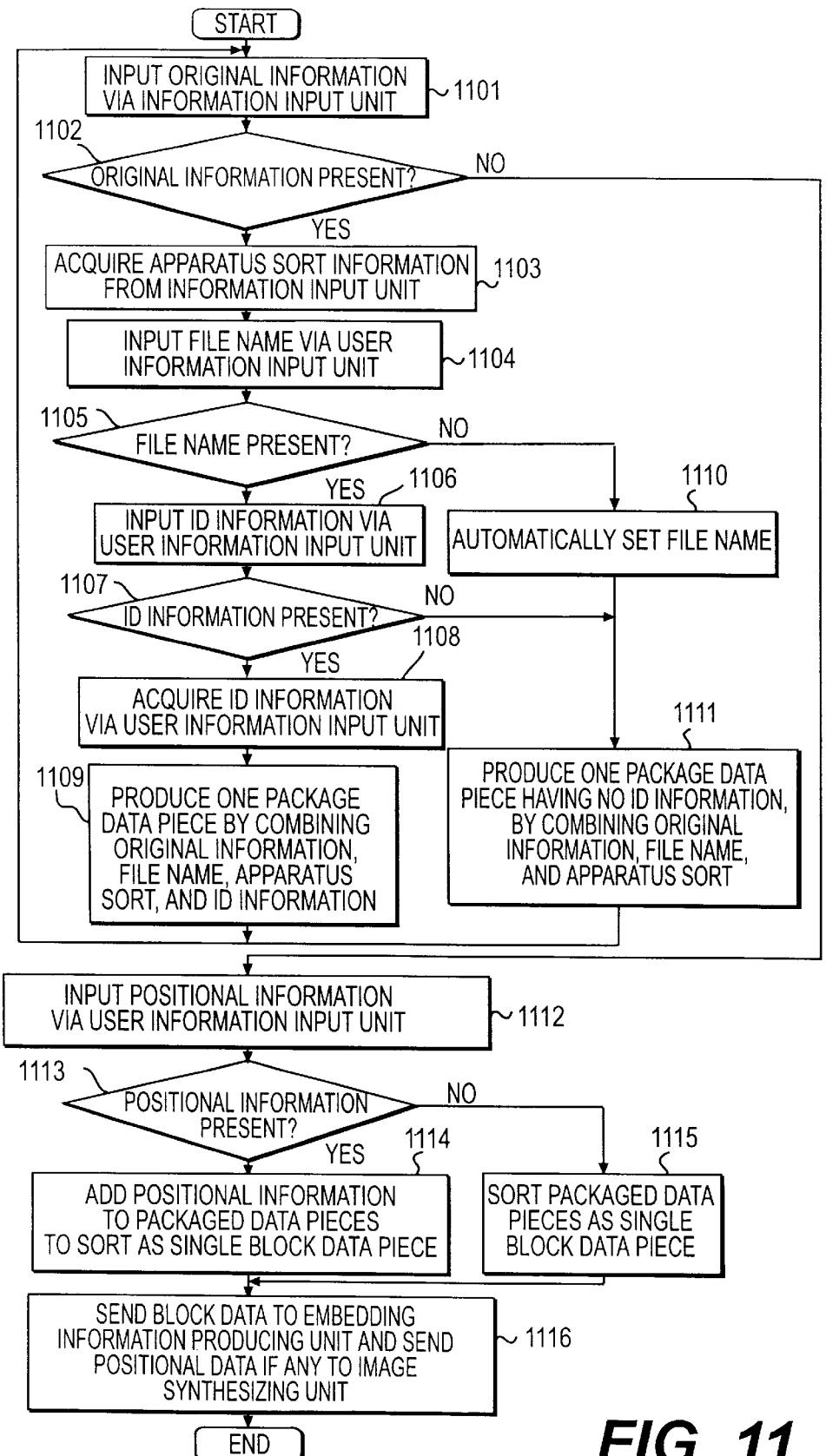
FIG. 11 is a flow chart for describing a process operation of an information attribute management control unit employed in the information printing process apparatus of FIG. 9.

First, a printing operation of the information printing process apparatus 200 will now be described with reference to a flow chart shown in FIG. 11. A basic printing process operation executed in this information printing process apparatus 200 is equal to that executed in the information processing apparatus 100 according to the first embodiment. In particular, since this information printing process apparatus 200 employs the normal printer in order to print an embedding code on a desirable portion of a certain document, an embedding region information (positional information) for indicating such a region into which embedding information is embedded is designated in a printing process operation of the embedding information.

When embedding information is printed by using the information printing process apparatus 200, a user firstly enters original information to be embedded from the input apparatus 10 via the information input unit 201. At this time, the information input unit 201 notifies an apparatus type (information of reproducing means) of such an input apparatus 10 used to enter the original information to the information attribute management control unit 103 in combination with the above-described original information. Also, if required, when the original information is entered from the input apparatus 10, the user enters such information as a file name, identification information, and apparatus information as the attribute information related to the original information by using the user information input unit 202. Furthermore, the user may enter positional information (information on embedding region) indicative of a position where the above-described embedding information is embedded by employing the user information input unit 202.

In response to the information input operation by the user, the information attribute management control unit 203 inputs the original information via the information input unit 201 (step 1101), and judges as to whether or not the original information is present (step 1102). If the original information is present (YES at step 1102), then the information attribute management control unit 203 acquires the apparatus type information (information of reproducing means) notified from the information input unit 201 in connection with the original information (step 1103).

Next, the information attribute management control unit 203 enters a file name among the attribute information related to the above-described original information via the user information input unit 202 (step 1104), and then checks as to whether or not the file name is present (step 1105). At this step, when the file name is present (YES at step 1105), the information attribute management control unit 203 inputs identification information via the user information input unit 202 (step 1106), and then judges as to whether or not the identification information is present (step 1107). If the identification information is present (YES at step 1107), then the information attribute management control unit 203 acquires the identification information via the user information input unit 202 (step 1108) to produce one package data piece by combing the above-described original information, apparatus type, file name, and identification information with each other, which have been acquired at previous steps 1101, 1103, 1104, and 1106 (step 1109).

Conversely, when the file name is not present in the above-described process operation (NO at step 1105), the information attribute management control unit 203 automatically sets a file name corresponding thereto (step 1110). Thereafter, when it is so judged at step 1107 that the identification information is not present, the information attribute management control unit 203 combines the original information, the apparatus type, and the file name with each other which have been acquired at steps 1101, 1103, and 1105 to thereby produce one package data having no identification information (step 1111). Subsequently, in such a case that a plurality of pieces of original information should be produced, the process operations defined at steps 1101 to 1111 are respectively executed plural times equal to the number of pieces of original information.

When the input operation of the above-described original information (NO at step 1102), the information attribute management control unit 203 inputs the positional information used to embed the original information via the user information input unit 202 (step 1112), and then checks as to whether or not the positional information is present (step 1113). In the case that the positional information (information of embedding region) is present (YES at step 1113), the information attribute management control unit 203 inserts the positional information into one or a plurality of data pieces contained in the package data produced at step 1109 or 1111, in order to sort these data pieces as a single block data piece constructed of the frame structure shown in FIG. 2 (step 1114). Conversely, when the positional information is not present (NO at step 1113), the information attribute management control unit 203 sorts the data pieces contained in the package data produced at step 1109 or 1111 as a single block data piece having no positional information and constructed of the frame structure shown in FIG. 2 (step 1115).

The information attribute management control unit 203 transmits the block data produced at step 1114 or 1115 as the information to be embedded to the embedding information producing unit 204. At this time, if positional information is present, then this positional information (information of embedding region) is sent to the image synthesizing unit 206 (step 1116).

Figure 12:
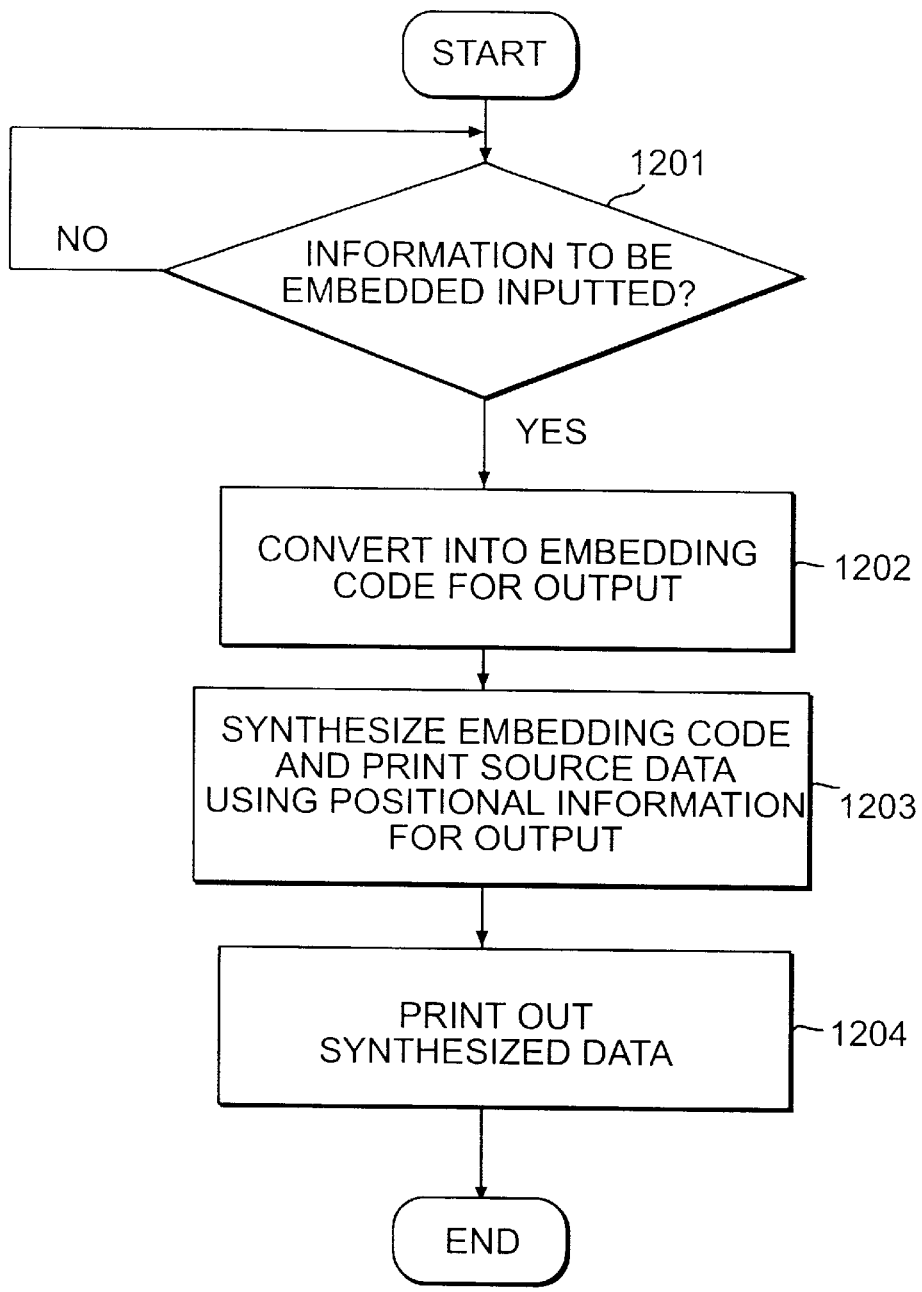
FIG. 12 is a flow chart for describing process operations of an embedding information producing unit, an image synthesizing unit, and an image output unit employed in the information printing process apparatus of FIG. 9.

The embedding information producing unit 204, the image synthesizing unit 206, and the image output unit 207 perform a printing process operation defined in a flow chart shown in FIG. 12 with respect to the block data sent from the information attribute control unit 203 in the above-described manner. First, after the embedding information producing unit 204 receives the above-described information to be embedded (YES at step 1201), the embedding information producing unit 204 converts this information to be embedded into an actual embedding code, and then sends the actual embedding code as image data to be embedded to the image synthesizing unit 206 (step 1202). To the image synthesizing unit 206, print source data (file data) corresponding to such a document into which an embedding code should be embedded -via the print information input unit 205 is inputted in addition to the above-described embedding image data. Furthermore, the embedding region information is entered from the information attribute management control unit 203 into the image synthesizing unit 206. As a result, the image synthesizing unit 206 synthesizes the embedding information produced from the embedding information producing unit 204 and the print source data entered from the print information input unit 205 with the embedding region information derived from the information attribute management control unit 203. Then, the image synthesizing unit 206 sends the synthesized data as image data to the image output unit 207 (step 1203). Subsequently, the image output unit 207 prints out the image data on a printing medium such as paper (step 1204).

With execution of the above-described writing process operation, for example, as indicated in FIG. 9, such a medium can be obtained in which the document information and the embedding information have been printed on a preselected position (position corresponding to the above-described embedding region information) of the document information. Apparently, the embedding information corresponds to the voice information, the video information, the explanatory description (text), or the document identifier based on the original information entered from the input apparatus 10. It should also be noted that in the above-described process operation defined at step 1112, when the positional information (embedding region information) is not entered, the input data (original information) entered at this time may be printed on a preset position contained in the above document. Thereafter, the embedding information printed on the printing medium is recognized by the information reproducing process apparatus 300. Since a basic recognizing process operation of the information reproducing process apparatus 300 is substantially the same as that of the information processing apparatus according to the first embodiment (see FIG. 6), a detailed description thereof is omitted.

It should also be understood that the information reproducing process apparatus 300 according to the second embodiment may be operated in accordance with the below-mentioned operation, since the information reproducing process apparatus 300 is arranged in such a manner that the information printing process apparatus 200 used in combination with the information reproducing process apparatus 300 stores the original information together with positional information indicative of a position used to embed the original information, and the embedding information can be printed based on the positional information.

That is to say, according to the arrangement of the above-described information printing process apparatus 200, the embedding information printed on the medium by the information printing process apparatus 200 corresponds to the information mode into which the original information and the positional information thereof are stored. As a consequence, on the side of the information reproducing process apparatus 300, the above-described positional information can be extracted from the image data produced by scanning the above-described embedding information. Even when the embedding information is scanned by employing a handheld scanner as the information reproducing process apparatus 300, it is possible to discriminate which region of the printing medium is scanned from the positional information. Since this scan position discriminating function is utilized, the information reproducing process operation apparatus 300 may be operated in such a manner that a means (output apparatus 20) for reproducing the original information contained in the embedding information to be scanned is selected based upon such a scanning operation, e.g., which region on the printing medium is scanned. In this case, the information reproducing process apparatus 300 is required to contain a position/reproducing means correspondence table into which information indicative of a correspondence relationship between the positional information and the reproducing means has been stored. This position/reproducing means correspondence table may be provided in, for instance, the information attribute management control unit 303.

In the image reproducing process apparatus 300 with the above-described arrangement, when the embedding information printed on the medium is reproduced, the user scans the embedding information region while attaching the image input unit 301 onto the embedding information region. In particular, in the case that a plurality of embedding information pieces are printed in a plurality of regions on a print medium, the user may select embedding information belonging to which medium based on his will, and scans this selected embedding information region while attaching the image input unit 301 to the selected embedding information.

In accordance with the above-described scanning operation, in the image input unit 301, image data corresponding to one or a plurality of embedding information pieces is produced, and then is supplied to the embedding information recognizing unit 302. The embedding information recognizing unit 302 executes the recognition process of the image data entered from the image input unit 301. As a result, after all of the embedded information pieces are extracted, the embedding information recognizing unit 302 supplies the extracted result to the information attribute management control unit 303. The information attribute management control unit 303 analyzes the data (recognition result) extracted at the embedding information recognizing unit 302 to extract the respective data pieces in accordance with the formats shown in FIG. 2, and then classifies/sorts these extracted data pieces.

Next, the information attribute management control unit 303 judges as to whether or not there is a plurality of input data pieces, namely embedded original information pieces, based upon the above-described classified/sorted results. When a plurality of input data pieces are present, the information attribute management control unit 303 retrieves the plural input data pieces so as to form a file table (file list) of these input data pieces. Subsequently, this file list of the input data pieces is displayed via the user information input unit 304 to the user, so that the user may be prompted to select which input data piece (original information) is reproduced. In response to this user's selection, such original information designated by the user through the user information input unit 304 is selected as information to be reproduced.

Furthermore, in the case that the identification information is added to the selected original information, the information attribute management control unit 304 prompts the user to input the identification information via the user information input unit 304, and also acquires the entered identification information in response to this request. Then, the information attribute management control unit 303 judges as to whether or not both of the identification information is made coincident with each other. When the identification information entered from the user information unit 304 is not made coincident with the identification information added to the original information, the process operation of the previously selected file is interrupted, and then the control is returned to a next file selection process operation.

To the contrary, when the identification information entered from the user information input unit 304 is made coincident with the identification information added to the original information, the information attribute management control unit 303 checks as to whether or not positional information is added to the selected original information based upon the classified/sorted result. If the positional information is added, then the information attribute management control unit 303 specifies a reproducing means (output apparatus 20) corresponding to the positional information with reference to the position/reproducing means correspondence table.

Next, the information attribute management control unit 303 interrogates the information output unit 305 as to whether or not the specified output apparatus 20 is connected thereto. When this interrogated output apparatus 20 is connected, the information attribute management control unit 303 sends out the apparatus type of the specified output apparatus 20 and the original information corresponding thereto to the information output unit 305. Then, in the information output unit 305, a control operation for reproducing the above-described original information is carried out by the output apparatus 20 corresponding to the apparatus sort.

On the other hand, in the case that the specified output apparatus 20 is not connected, the user enters the output apparatus 20 functioning as the reproducing means through the user information input unit 304. Subsequently, the information attribute management control unit 303 sends out the entered apparatus type of the output apparatus 20 and the entered original information to the information output unit 305. Then, in this information output unit 305, a control operation for reproducing the above-described original information is carried out by the output apparatus 20 corresponding to the apparatus sort. It should be noted that the process operation executed when the specified output apparatus 20 is not connected may be replaced by a method for automatically selecting a predetermined output apparatus 20. In this alternative case, for instance, such a process operation may be conceived that the above-described selected original information is stored in the hard disk unit (20d).

Figure 13:
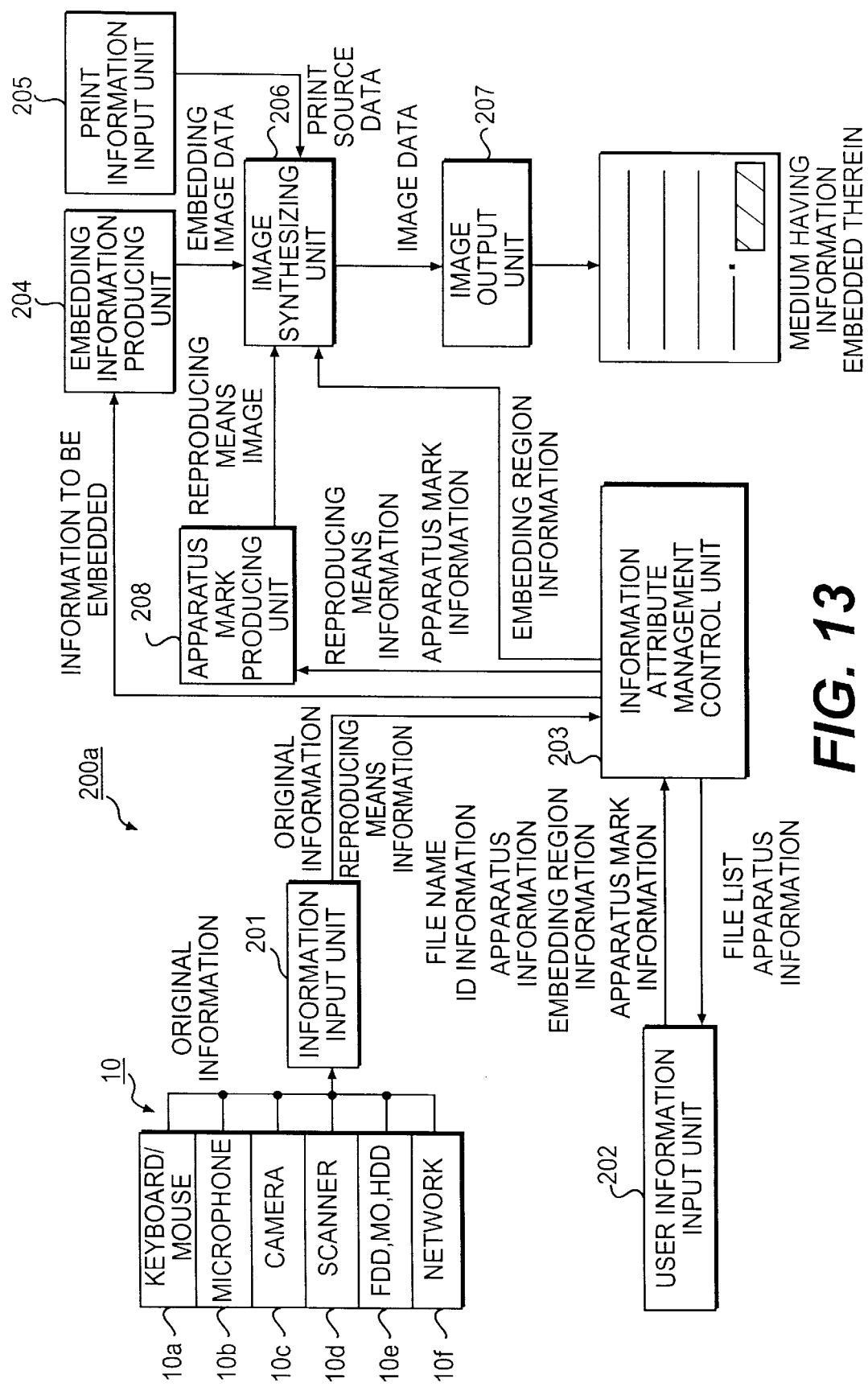
FIG. 13 is a schematic block diagram showing a functional arrangement of an information printing process apparatus according to a third preferred embodiment of the present invention.
Figure 14:
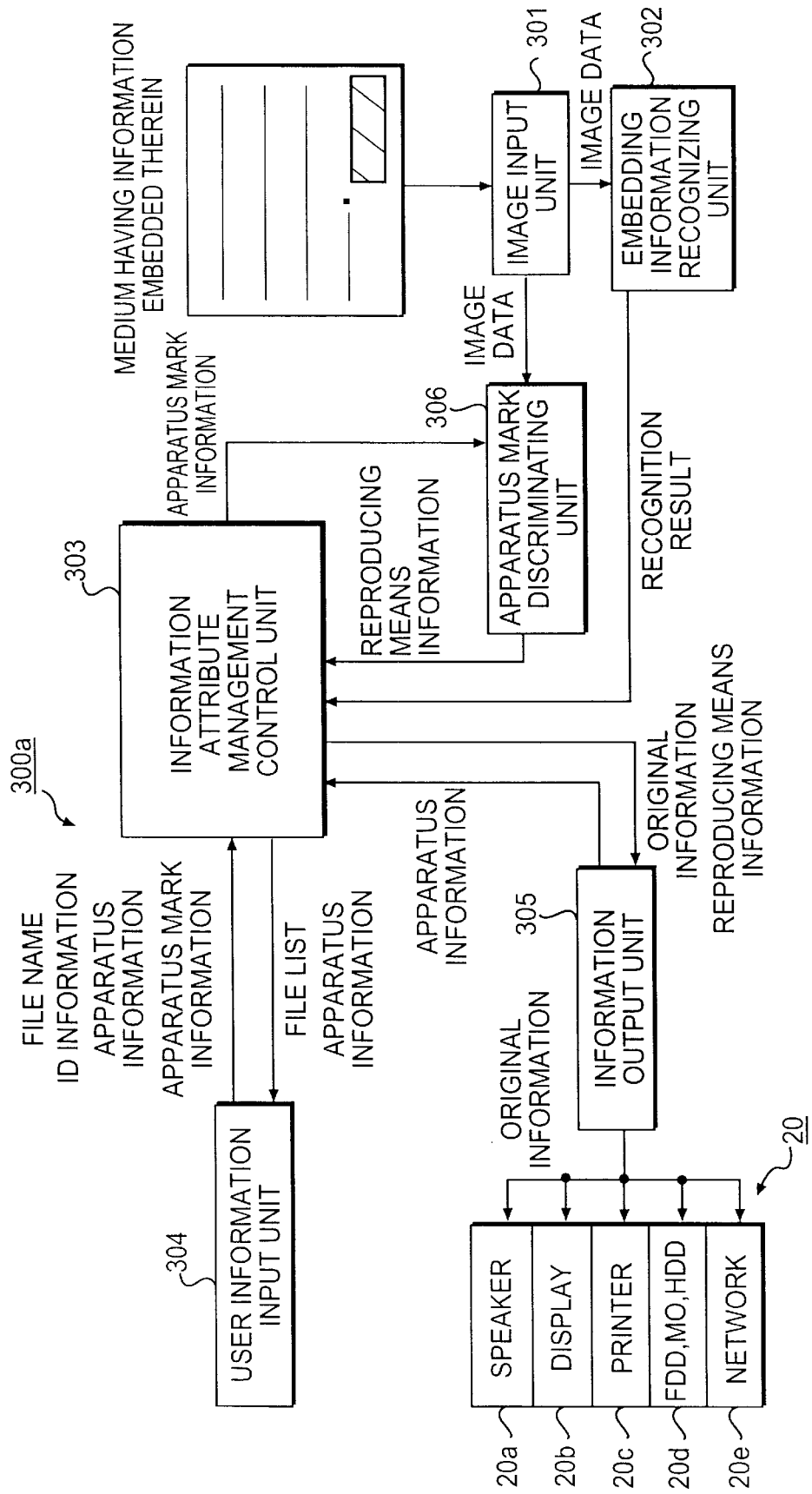
FIG. 14 is a schematic block diagram showing a functional arrangement of an information reproducing process apparatus according to the third embodiment.

Now, a third preferred embodiment of the present invention will be described. FIGS. 13 and 14 are block diagrams showing functional arrangements of information printing/reproducing apparatuses 200a and 300a according to the third embodiment of the present invention. It should be noted that this third embodiment is a modification of the second embodiment, and the information printing process apparatus 200a is separately provided with the information reproducing process apparatus 300a. As shown in FIG. 13, the information printing process apparatus 200a is especially arranged by adding an apparatus mark producing unit 208 to the information printing process apparatus 200 according to the second embodiment. The information reproducing process apparatus 300a shown in FIG. 14 is especially arranged by adding an apparatus mark discriminating unit 306 to the information reproducing process apparatus 300 according to the second embodiment. This third embodiment owns such a function that an apparatus mark indicative of an apparatus capable of reproducing embedding information in relation to the embedding information is printed with respect to the embedding information, and thereafter the embedded code is scanned to recognize the apparatus mark for reproducing the corresponding original information.

Figure 16:
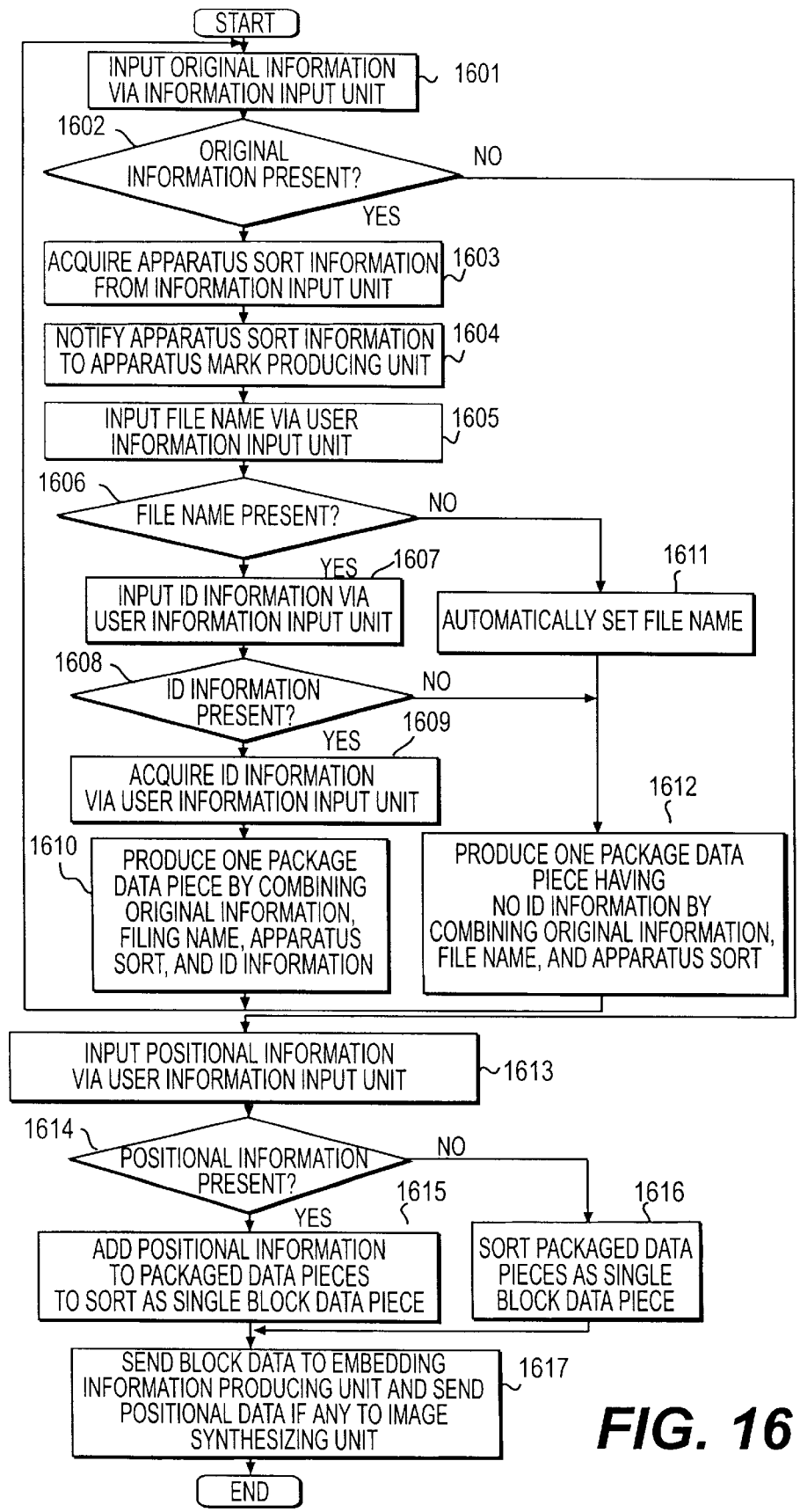
FIG. 16 is a flow chart for describing a process operation of an information attribute management control unit employed in the information printing process apparatus of FIG. 13.

First, a printing operation of the information printing process apparatus 200a will now be described with reference to a flow chart shown in FIG. 16. A basic printing process operation executed in this information printing process apparatus 200a is equal to that executed in the information printing process apparatus 200 according to the second embodiment. In particular, in this information printing process apparatus 200a, a process operation is additionally provided. That is, an apparatus mark used to reproduce embedding information is printed together with the embedding information. When embedding information is printed by using the information printing process apparatus 200a, a user firstly enters original information to be embedded from the input apparatus 10 via the information input unit 201. At this time, the information input unit 201 notifies an apparatus type (information of reproducing means) of such an input apparatus 10 used to enter this original information to the information attribute management control unit 103 in combination with the original information. Also, if required, when the original information is entered from the input apparatus 10, the user enters such information as a file name, identification information, and apparatus information as the attribute information related to the original information by using the user information input unit 202. Furthermore, the user may enter positional information (information on embedding region) indicative of a position where the embedding information is embedded by employing the user information input unit 202.

In response to the information input operation by the user, the information attribute management control unit 203 inputs the original information via the information input unit 201 (step 1601), and judges as to whether or not the original information is present (step 1602). If the original information is present (YES at step 1602), then the information attribute management control unit 203 acquires the apparatus type information (information of reproducing means) notified from the information input unit 201 in connection with the original information (step 1603), and notifies this apparatus type information to the apparatus mark producing unit 208 (step 1604). Next, the information attribute management control unit 203 enters a file name among the attribute information related to the above-described original information via the user information input unit 202 (step 1605), and then checks as to whether or not the file name is present (step 1606). At this step, when the file name is present (YES at step 1606), the information attribute management control unit 203 inputs identification information via the user information input unit 202 (step 1607), and then judges as to whether or not the identification information is present (step 1608).

If the identification information is present (YES at step 1608), then the information attribute management control unit 203 acquires the identification information via the user information input unit 202 (step 1609) to produce one package data piece by combing the above-described original information, apparatus type, file name, and identification information with each other, which have been acquired at previous steps 1601, 1603, 1605, and 1607 (step 1610). Conversely, when the file name is not present in the above-described process operation (NO at step 1606), the information attribute management control unit 203 automatically sets a file name corresponding thereto (step 1611). Thereafter, when it is so judged at step 1608 that the identification information is not present, the information attribute management control unit 203 combines the original information, the apparatus type, and the file name with each other which have been acquired at steps 1601, 1603, and 1607 to thereby produce one package data piece having no identification information (step 1612). Subsequently, in such a case that a plurality of pieces of original information should be produced, the process operations defined at steps 1601 to 1612 are respectively executed plural times equal to the number of pieces of original information.

When the input operation of the above-described original information is ended (NO at step 1602), the information attribute management control unit 203 inputs the positional information used to embed the original information via the user information input unit 202 (step 1613), and then checks as to whether or not the positional information is present (step 1614). In the case that the positional information (information of embedding region) is present (YES at step 1614), the information attribute management control unit 203 inserts the positional information into one or a plurality of data pieces contained in the package data produced at step 1610 or 1612, in order to sort these data pieces as a single block data piece constructed of the frame structure shown in FIG. 2 (step 1615). Conversely, when the positional information is not present (NO at step 1614), the information attribute management control unit 203 sorts the data pieces contained in the package data produced at step 1610 or 1612 as a single block data piece having no positional information and constructed of the frame structure shown in FIG. 2 (step 1616). Next, the information attribute management control unit 203 transmits the block data produced at step 1615 or 1616 as the information to be embedded to the embedding information producing unit 204. At this time, if positional information is present, then this positional information (information of embedding region) is sent to the image synthesizing unit 206 (step 1617).

Figure 17:
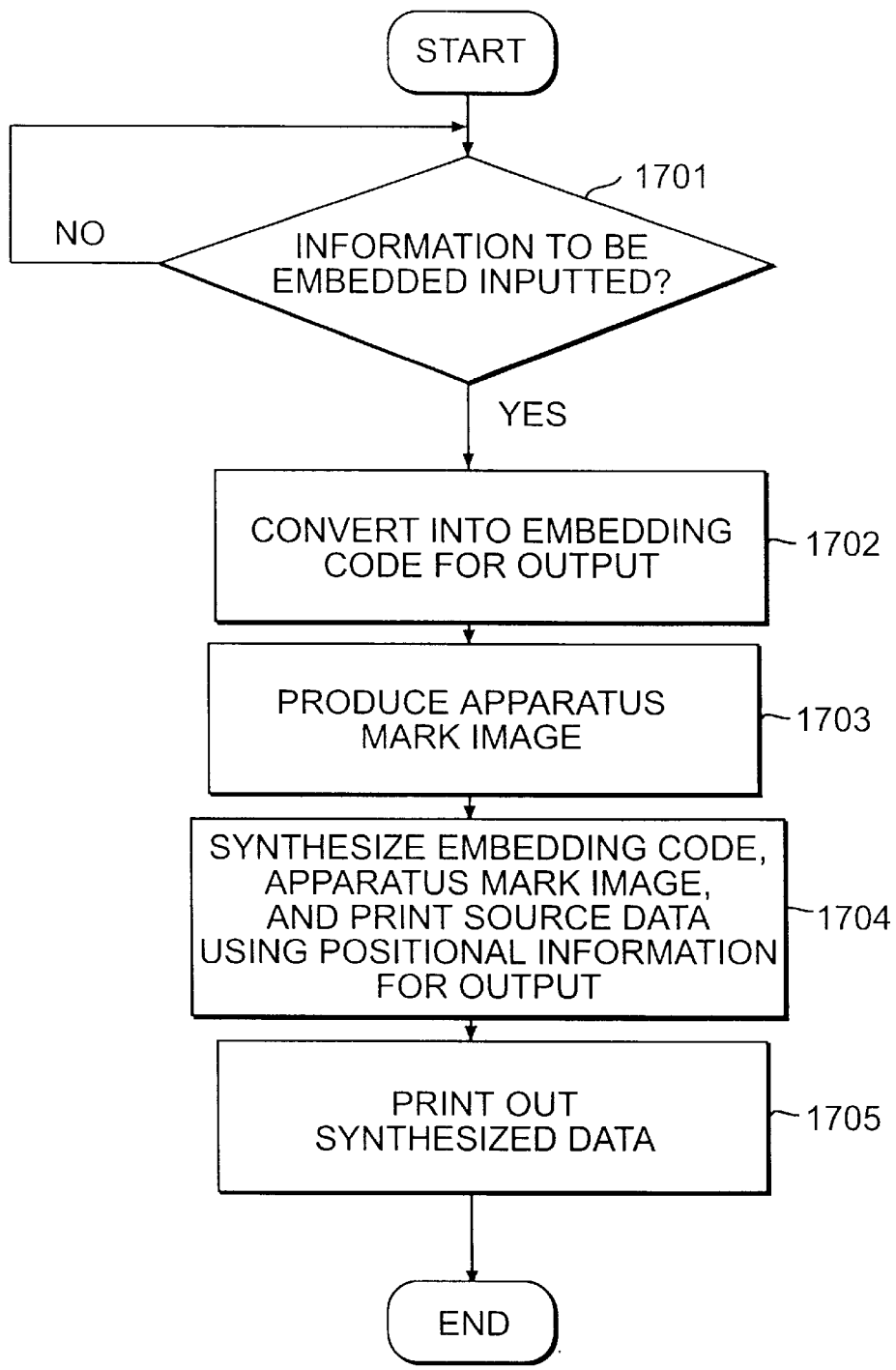
FIG. 17 is a flow chart for describing process operations of an embedding information producing unit, an apparatus mark producing unit, an image synthesizing unit, and an image output unit employed in the information printing process apparatus of FIG. 13.

The apparatus mark producing unit 208, the embedding information producing unit 204, the image synthesizing unit 206, and the image output unit 207 perform a printing process operation defined in a flow chart shown in FIG. 17 with respect to the block data sent from the information attribute control unit 203 in the above-described manner. First, after the embedding information producing unit 204 receives the above-described information to be embedded (YES at step 1701), the embedding information producing unit 204 converts the information to be embedded into an actual embedding code, and then sends the actual embedding code as image data to be embedded to the image synthesizing unit 206 (step 1702). Also, the apparatus mark producing unit 208 produces an apparatus mark image (image of reproducing means) for the apparatus type information notified from the information attribute management control unit 203 by executing the process operation of step 1704, and then sends out the produced apparatus mark image to the image synthesizing unit 206 (step 1703).

To the image synthesizing unit 206, print source data (file data) corresponding to such a document into which an embedding code should be embedded via the print information input unit 205 is inputted in addition to the above-described embedding image data and the apparatus mark image produced from the apparatus mark producing unit 208. Furthermore, the embedding region information is entered from the information attribute management control unit 203 into the image synthesizing unit 206. As a result, the image synthesizing unit 206 synthesizes the embedding image data produced from the embedding information producing unit 204, the apparatus mark image produced from the apparatus mark producing unit 208, and the print source data entered from the print information input unit 205 with the embedding region information derived from the information attribute management control unit 203. Then, the image synthesizing unit 206 sends the synthesized data as image data to the image output unit 207 (step 1704). Subsequently, the image output unit 207 prints out the image data on a printing medium such as paper (step 1705).

Figure 15C:
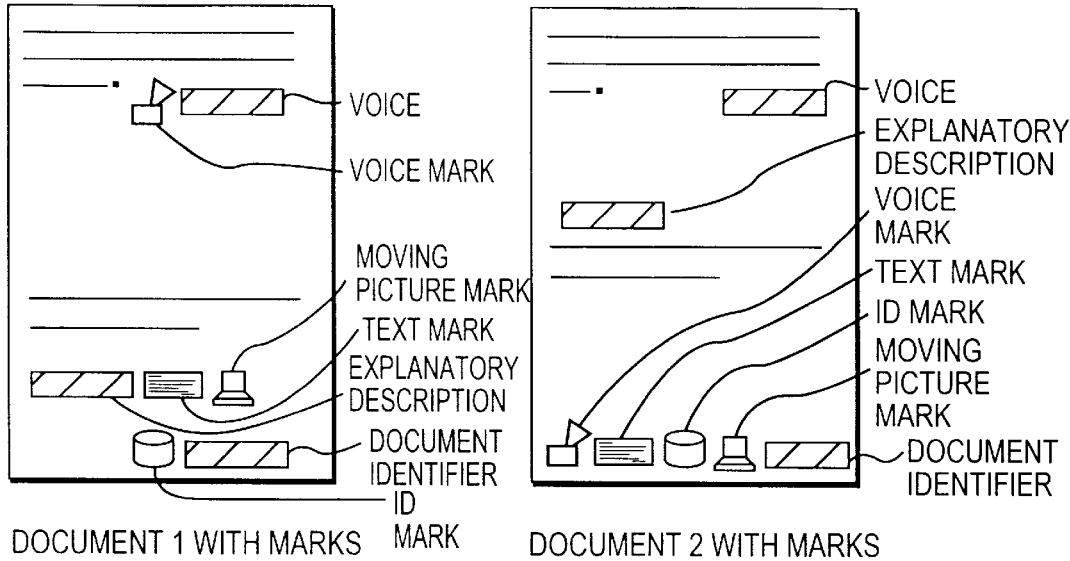
Figure 15C:
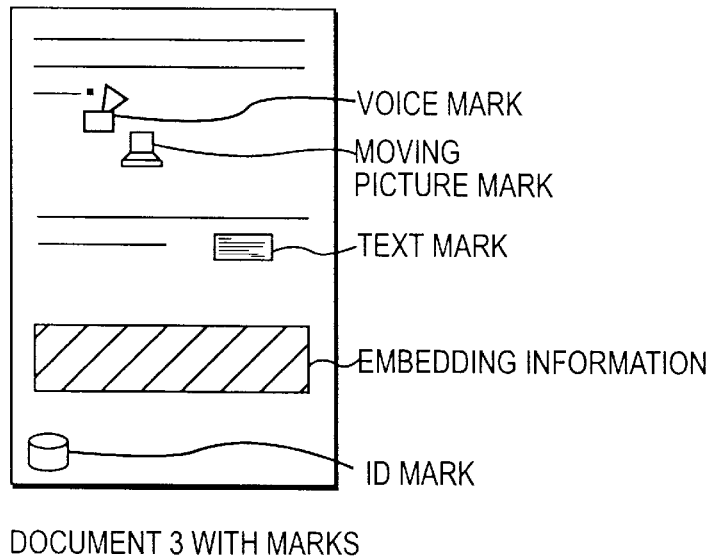

With execution of the above-described writing process operation, for example, as indicated in FIG. 15(*a*), such a medium can be obtained in which the document information and the embedding information, and also the apparatus mark have been printed on a preselected position (position corresponding to the above-described embedding region information) of this document information. Apparently, the embedding information corresponds to the voice information, the video information, the explanatory description (text), or the document identifier based on the original information entered from the input apparatus 10. According to the information printing process apparatus 200*a*, since a voice mark, a text mark, a moving picture mark, and an ID mark, which represent the reproducing means of the embedding information pieces, are printed adjacent to the respective embedding information pieces, the user can confirm at a glance that while the respective embedding information pieces are reproduced, a sound is produced, an image is observed, or an explanation is made of a character stream.

It should also be understood that in the information printing process apparatus 200*a*, for instance, as illustrated in FIG. 15(*b*), only the embedding information may be printed on an arbitrary position of the printing medium and the apparatus mark may be collected at a defined position in a lower portion of the printing medium to be printed thereon in addition to another printing operation such that the apparatus mark is printed near the embedding information. This alternative printing operation is a method executed in the case that, for example, at above-described step 1614, the positional information (embedding region information) is not entered. Furthermore, as illustrated in FIG. 15(c), in the information printing process operation 200a, the apparatus mark may be printed at an arbitrary position of the printing medium, and the embedding information may be collected at one place on the printing medium to be printed thereon.

On the other hand, in the information reproducing process apparatus 300a (see FIG. 14) according to the third embodiment, when the embedding information printed by the information printing process apparatus 200a is reproduced, the user scans the embedding information region while attaching the image input unit 301 onto the embedding information region. In particular, in the case that a plurality of embedding information pieces are printed in a plurality of regions on a print medium, the user may select embedding information belonging to which medium based on his will, and scans the selected embedding information region while attaching the image input unit 301 to the selected embedding information. In particular, in this embodiment, the printing medium to be scanned is such a printing medium that, for example, as shown in FIG. 15(a), the apparatus mark is printed very close to the region where the embedding information has been described by executing the printing process of the information printing process apparatus 200a. The user can immediately recognize based on the apparatus mark as to what type (apparatus) of the information has been embedded in the embedding information region to be reproduced. As a consequence, the user may recognize in advance the type of the information to be reproduced, even when the user does not know the content of the embedded information. Thus, the user can very easily select which information is to be reproduced.

In accordance with the above-described scanning operation, in the image input unit 301, image data corresponding to one or a plurality of embedding information pieces to be scanned is produced, and then is supplied to the embedding information recognizing unit 302 and also the apparatus mark discriminating unit 306. The embedding information recognizing unit 302 executes the recognition process of the image data entered from the image input unit 301. As a result, after all of the embedded information are extracted, the embedding information recognizing unit 302 supplies this extracted result to the information attribute management control unit 303.

On the other hand, the apparatus mark discriminating unit 306 executes the recognizing process operation of the image data entered from the image input unit 301, and only when the apparatus mark discriminating unit 306 recognizes that the image data is equal to the apparatus mark information, the apparatus mark information corresponding to the recognition result is sent to the information attribute management control unit 303. In the information attribute management control unit 303, the above-described apparatus mark information is utilized as such information used to select data to be reproduced within the input data in the case that the recognition results (input data: original information) of a plurality of embedding information pieces are acquired from the embedding information recognizing unit 302. As a result, in the information reproducing process apparatus 300a, while only one piece of the embedding information is scanned, the original information among the scanned embedding information is reproduced in accordance with the attribute information thereof. In addition, after a plurality of embedding information pieces are sequentially scanned, the apparatus mark information pieces corresponding to the reproducing means are sequentially scanned, and thus, the original information is selected in response to the apparatus mark so as to be reproduced.

Figure 18:
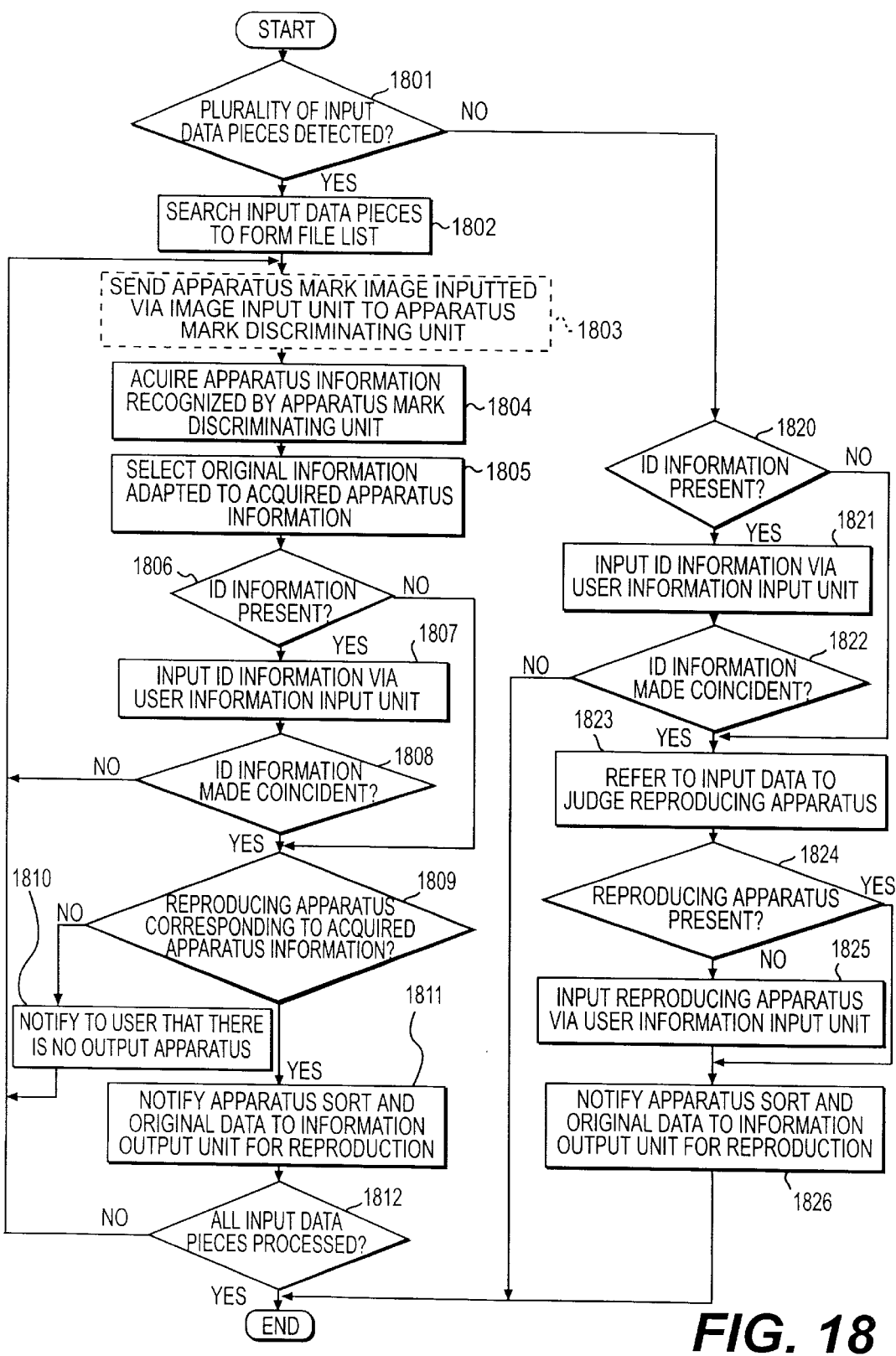
FIG. 18 is a flow chart for describing an embedding information reproducing process operation of the information reproducing process apparatus of FIG. 14.

Referring now to a flow chart shown in FIG. 18, a detailed description will be made of a reproducing operation by the information attribute management control unit 303 of the information reproducing process operation 300a based upon the recognition results obtained from the embedding information recognizing unit 302 and the apparatus mark discriminating unit 306. First, the information attribute management control unit 303 analyzes the data (namely, recognition results) extracted by the embedding information recognizing unit 302, and then extracts the respective data pieces in accordance with the format shown in FIG. 2. Then, the information attribute management control unit 303 classifies and sorts the extracted data pieces. Next, the information attribute management control unit 303 judges as to whether or not there are a plurality of input data pieces, namely embedded original information pieces, based upon the above-described classified/sorted results (step 1801). When only one input data piece is present (NO at step 1801), the information attribute management control unit 303 judges as to whether or not identification information is added to the input data (original information) (step 1820). In the case that the identification information is added to the input data (YES at step 1820), the information attribute management control unit 303 prompts the user to input the identification information via the user information input unit 304, and also acquires the entered identification information via the user information input unit 304 in response to this request (step 1821). Then, the information attribute management control unit 303 judges as to whether or not both of the identification information are made coincident with each other (step 1822).

When the identification information entered from the user information input unit 304 is not made coincident with the identification information added to the original information (NO at step 1822), the subsequent process operation is interrupted. To the contrary, when the identification information entered from the user information input unit 304 is made coincident with the identification information added to the original information (YES at step 1822), while referring to the attribute information of the previously selected file (input data (original information)), a judgement is made of the output apparatus 20 for reproducing this file (step 1823). This judgement may be carried out with reference to an expander of a file type (apparatus type) among attribute information to be inserted into, for example, the above-described selected file.

Next, the information attribute management control unit 303 interrogates the information output unit 305 as to whether or not the output apparatus 20 judged as the reproducing means is connected thereto (step 1824). When this interrogated output apparatus 20 is connected (YES at step 1824), the information attribute management control unit 303 sends out the apparatus type of the output apparatus 20 judged at step 1823 and the original information corresponding thereto to the information output unit 305. Then, in the information output unit 305, a control operation for reproducing the above-described original information is carried out by the output apparatus 20 corresponding to this apparatus type (step 1826). On the other hand, in the case that the output apparatus 20 judged as the reproducing means is not connected (NO at step 1824), the user enters the output apparatus 20 functioning as the reproducing means through the user information input unit 304 (step 1825). Subsequently, the information attribute management control unit 303 sends out the entered apparatus type of the output apparatus 20 and the entered original information to the information output unit 305. Then, in the information output unit 305, a control operation for reproducing the above-described original information is carried out by the output apparatus 20 corresponding to the apparatus type (step 1826).

To the contrary, when a plurality of input data pieces, namely embedded original information pieces are present (YES at step 1801), the information attribute management control unit 303 retrieves the plural input data pieces so as to form a file table (file list) of the input data pieces (step 1802). Subsequently, this file list of the input data pieces is displayed via the user information input unit 304 to the user, so that the user may be prompted to select which input data piece (original information) is reproduced. As previously described, in the information reproducing apparatus 300*a*, when the input data piece to be reproduced is selected from a plurality of input data pieces, the apparatus mark printed on the medium to be scanned may be scanned. As to the apparatus mark, for example, it is printed near the embedding information region. Also, the apparatus mark is printed at a corner of each page, a specific page, or a supplemental portion of a main description. Assuming now that the user scans a certain apparatus mark region on a medium, image data (apparatus mark image) corresponding to the apparatus mark is sent via the image input unit 301 to the apparatus mark discriminating unit 306 (step 1803). The apparatus mark discriminating unit 306 discriminates that the apparatus mark designates which apparatus based on the input image data, and thereafter sends apparatus mark information as the discrimination result to the information attribute management control unit 303.

The information attribute management control unit 303 acquires the apparatus mark information from the apparatus mark discriminating unit 306 (step 1804), and then selects the original information (file) adapted to the acquired apparatus mark information from the above-described file list (step 1805). Next, the information attribute management control unit 303 judges as to whether or not the identification information is added to the original information selected at step 1805 (step 1806). In the case that the identification information is added (YES at step 1806), the information attribute management control unit 303 prompts the user to input the identification information via the user information input unit 304, and also acquires the entered identification information via the user information input unit 304 in response to this request (step 1807). Then, the information attribute management control unit 303 judges as to whether or not both of the identification information are made coincident with each other (step 1808). It should be understood that when the identification information is not added to the original information (NO at step 1806), the control is advanced to the next process operation by jumping over the process operations defined at steps 1807 and 1808.

When the identification information entered from the user information input unit 304 is not made coincident with the identification information added to the original information (NO at step 1808), the process operation of the file previously selected at step 1805 is interrupted, and then the control is returned to a next file selection process operation (step 1803). To the contrary, when the identification information entered from the user information input unit 304 is made coincident with the identification information added to the original information (YES at step 1808), while referring to the attribute information (apparatus attribute (expander)) of the previously selected file (input data (original information)), a judgement is made of the output apparatus 20 for reproducing the file. Next, the information attribute management control unit 303 interrogates the information output unit 305 as to whether or not the output apparatus 20 judged as the reproducing means is connected thereto (step 1809). When the interrogated output apparatus 20 is connected (YES at step 1809), the information attribute management control unit 303 sends out the apparatus type of the output apparatus 20 judged at step 1809 and the original information corresponding thereto to the information output unit 305. Then, in the information output unit 305, a control operation for reproducing the above-described original information is carried out by the output apparatus 20 corresponding to the apparatus type (step 1811). On the other hand, in the case that the output apparatus 20 judged as the reproducing means is not connected (NO at step 1809), the information attribute management control unit 303 notifies to the user as the error process operation such a message that there is no output apparatus 20 judged as the reproducing means by displaying this message on the user information input unit 304 (step 1810). It should be noted that the process operation defined at step 1810 may be replaced by a method for automatically selecting a predetermined output apparatus 20. In this alternative case, for instance, such a process operation may be conceived that the above-described selected original information is stored in the hard disk unit (20*d*).

Thereafter, the information attribute management control unit 303 monitors as to whether or not all of the input data pieces have been processed (step 1812). When there is input data pieces which has not yet been processed (NO at step 1812), the process operations defined at steps 1803 to 1811 are repeatedly performed until all of the input data pieces are processed (YES at step 1812). It should be understood that as the method for selecting the original information with respect to the file list shown at step 1802, a method for designating a wild card with respect to the file list may be conceived. In such a case that the wild card is designated, a file (original information) selection at the subsequent step may be automatically performed by the system to repeatedly perform the process operations defined at steps 1820 to 1826.

It should also be noted that in the third embodiment, the image input unit 301 may be constituted by employing the rotary encoder unit 106 shown in FIG. 3 similarly to the first embodiment. Also, similarly to the first embodiment, the image input unit 301 may be realized by, for instance, an apparatus such as a digital camera or a video camera, and furthermore, a non-contact-type scanner such as a laser scanner.

As previously described, in the third embodiment, after a plurality of input data pieces are acquired into the information attribute management control unit 303 by scanning the embedding information region by the image input unit 301, the apparatus mark corresponding to the desirable reproducing means is scanned. The information attribute management control unit 303 recognizes that which apparatus should be used as the reproducing apparatus based upon the input image data pieces acquired from this scanning operation, and then reproduces the original information adapted to the reproducing apparatus by the reproducing process operation. When the apparatus mark cannot be properly recognized due to noise and the like, if the same apparatus mark given to another page is scanned, then it is possible to obtain a similar recognition result when the first-mentioned apparatus mark causing this error recognition is scanned. Further, the apparatus mark used in the third embodiment may be previously set, or may be arbitrarily set by the user in accordance with the system by entering predetermined set information via the user input unit 304. As previously described, since the user defines the apparatus mark and the apparatus mark defining means is added in such a manner that the defined apparatus mark can be used in the system itself, the user can freely define the apparatus mark to improve the operability of the overall system.

As previously described in detail, according to the present invention, the information processing apparatus is arranged by the printing process unit, and the scanning/recognizing process unit. In the printing process unit, when the original information is inputted, the attribute information related to the original information is entered, if required, and then the embedding information is produced by using the information to be embedded which is constituted by the original information and the attribute information. Thus, the embedding information is printed on the medium. In the scanning/recognizing process unit, the above-described embedding information on the medium is read to sort the original information and the attribute information contained in the embedding information, and then the reproducing means (output apparatus) is determined every original information by employing the attribute information to reproduce this original information. As a result, specific ink and magnetic material are no longer required as the embedding information. The embedding information can be printed and reproduced by using the normal image input apparatus, such as a scanner, a camera, a digital camera, and a video camera, and also the normal image output apparatus such as a laser printer, an ink jet printer, and a thermal transfer printer. Also, since the specific ink and the magnetic material are not used, when the medium on which the embedding information has been printed is duplicated by a copying machine, this embedding information can be copied together. Even in such a case that a large number of documents into which the embedding information has been embedded are distributed, only one medium on which the embedding information has been printed may be merely copied without repeatedly printing the embedding information for a large number of media.

Also, according to the present invention, in the printing process unit, the original information entered by the user and the attribute information indicative of the classification of the original information are stored together. Furthermore, while using the function capable of storing the relationship between the original information and the attribute information, the expander and the file name useable to discriminate a plurality of original information pieces are stored as one piece of the above-described attribute information. The expander indicates which type of original information, for example, voice, video, image, text, identifier, and the Internet address. In the scanning/recognizing process unit, the original information and the attribute information are recognized based on the input information when the embedding information is scanned. In accordance with the attribute information, the reproducing means of the original information is selected so as to automatically reproduce the original information. As a consequence, since the embedding information is merely scanned, the original information contained in the embedding information can be reproduced in such an optimum form to the original information, and further the system can be operated even when the user does not know in advance the content or sort of the original information.

Also, in the present invention, since the printing process unit is so arranged that the original information and also the positional information indicative of the position where this original information is embedded are stored, and further the embedding information can be printed based on the positional information, the position on the medium into which the original information is embedded can be freely set by the user himself. Thus, the embedding information can be printed near the relevant portion on the medium in order that the user can recognize that the original information is related thereto.

Also, in the present invention, the scanning/recognizing process unit can be made of a handheld scanner type structure, while the scanning/recognizing process unit can be completely separated from the printing process unit. As a result, even in such a case that a plurality of original information pieces are embedded in the separate regions on a single medium, the user can select the embedding code region to be reproduced by his own will and can reproduce the selected embedding code region while properly moving the handheld scanner. In this case, since the embedding information on the medium is such an information format that the original information and the positional information thereof are stored by the above-described printing process operation in the printing process unit, even when this medium is scanned by the handheld scanner, the user can grasp which region on this medium is scanned. Also, since this scanning position discriminating function is utilized, the information processing method may be varied by such a condition, namely which region on the medium is scanned.

Also, in the present invention, the scanning/recognizing process unit is arranged in such a manner that the input information during the scanning operation is sorted into the original information and the reproducing means information, and therefore the reproducing means of the original information can be discriminated in response to the function of the printing process unit for storing the attribute information indicative of the reproducing means of the original information in connection with the original information. As a consequence, even when any of the input apparatuses is used, the original information can be reproduced in a similar manner. Thus, the original information can be reproduced even when the user does not know anything.

Also, in the present invention, the scanning/recognizing process unit is arranged in such a manner that the input information is sorted into the original information and the attribute information, and therefore the reproducing means of the original information can be discriminated, and further the printing process unit is arranged by storing the attribute information indicative of the reproducing means of the original information in connection with this original information. Accordingly, the user can freely set his own idea to the attribute information for determining the reproducing method via the printing process unit, and the user can define the effective process operations in the limited range.

In addition, in the present invention, the printing process unit may own such a function that the identification information is set as one piece of the attribute information with respect to each of the original information pieces, and thus the identification information is stored every original information in relation to the original information. The scanning/recognizing process unit may have such a function. That is, when there is the identification information in correspondence with the original information in the input information obtained during the scanning operation, the user is prompted to input the identification information, and a judgment is made as to whether or not the entered identification information is made coincident with the identification information added to the original information. As a result, when the identification information is set in the attribute information, the scanning/recognizing process unit identifies the identification information entered from the user during the scanning recognition with the identification information contained in the attribute information. In such a case that the identification information entered by the user is not correct, the further process operation is stopped.

Also, in the present invention, the printing process unit may have such a function that the apparatus mark for reproducing the embedding information is printed immediately near the embedding information. As a result, while the user observes the apparatus mark, the user can recognize at a glance as to whether the image can be seen, the sound can be produced, or the explanatory description made of the character stream can be made with respect to the embedding information.

Also, in the present invention, the scanning/recognizing process unit may own such a function that based upon the input information obtained when the apparatus mark printed on the medium is scanned, or decision is made as to which reproducing apparatus can reproduce the embedding information. As a consequence, when a plurality of apparatus marks are printed on the medium, the apparatus mark to be reproduced is merely scanned, so that the corresponding embedding information can be reproduced by using the reproducing apparatus relevant to the desirable apparatus mark without requiring a specific reproducing apparatus setting means.

Also, in the present invention, the apparatus mark defining means may be provided by which the user can define the apparatus mark, and the defined apparatus mark can be used in the system itself. As a result, the user can freely define the apparatus mark, and the operability of the system can be improved.

Moreover, according to the present invention, the printing process unit and the scanning/recognizing process unit may be formed as an integral structure made of a handheld printer and a handheld scanner. In this case, since the handheld printer is utilized, the embedding codes can be printed on even any types of printable media containing paper. Also, in this arrangement, such a process operation mode may be added. That is, the input information acquired by the scanning operation by the handheld scanner is again converted into the embedding information, and thereafter the converted embedding information is printed by using the handy printer. Therefore, the system may be operated in such a manner that embedding information printed on a certain medium is scanned/recognized, and after the scanned/recognized embedding information is directly reconverted into the embedding information, or is reconverted with being edited into the embedding information, the resultant embedding information is printed on the same medium or another medium.

What is claimed is:

1. An information processing method comprising the steps of:
   inputting original information from an input apparatus;
   inputting attribute information of the original information;
   combining the original information with the attribute information in accordance with a correspondence relationship therebetween to thereby produce information to be embedded;
   producing embedding information from the information to be embedded;
   producing an apparatus mark image indicative of an output apparatus based on the information type of the original information;
   printing the embedding information and the apparatus mark image on a recording medium;
   read-scanning the embedding information to thereby input image information;
   recognizing the embedding information from the inputted image information;
   resolving the recognized embedding information into the original information and the attribute information so as to determine the output apparatus used to reproduce the original information in accordance with the attribute information corresponding thereto; and
   outputting the original information to the output apparatus.

2. The information processing method as claimed in claim 1, wherein the attribute information is at least one of a file name of each piece of the original information when a plurality of pieces of the original information are stored, an expander indicative on an information type of the original information, and identification information corresponding to the original information.

3. The information processing method as claimed in claim 2, wherein the information type of the original information is at least one of a voice, a video, an image, a text, an identifier, and an address of the Internet.

4. The information processing method as claimed in claim 2, wherein the attribute information includes embedding positional information of the original information.

5. The information processing method as claimed in claim 4, wherein in said printing step, the embedding information is printed out at a position corresponding to the embedding positional information based on the embedding positional information.

6. The information processing method as claimed in claim 4, wherein in said resolving step, the output apparatus is determined in accordance with the positional information among the attribute information contained in the embedding information.

7. The information processing method as claimed in claim 2, wherein in said resolving step, the output apparatus is determined in accordance with the original information type among the attribute information contained in the embedding information.

8. The information processing method as claimed in claim 2, wherein said resolving step includes a step of prompting an entry of the identification information by recognizing the identification information added to the original in formation contained in the embedding information, and a step of comparing inputted identification information with the identification information added to the original information, and for prohibiting the reproduction of the original information when the inputted identification information is not made coincident with the added identification information.

9. The information processing method as claimed in claim 2, wherein said original information inputting step includes a step of notifying said combining step of apparatus information of the input apparatus for originating the original information when the original information is inputted, wherein in said combining step includes allocating an expander indicative of the information type based upon the apparatus information.

10. The information processing method as claimed in claim 1, further comprising the steps of recognizing the apparatus mark from the inputted image information in said image information inputting step, and selecting an output apparatus corresponding to the recognized apparatus mark as a reproduction destination of the original information corresponding thereto.

11. The information processing method as claimed in claim 10, further comprising the steps of defining the apparatus mark, wherein said apparatus mark producing step and said apparatus mark recognizing step are controlled based upon a definition content of said apparatus mark defining step in order to produce or recognize an apparatus mark.

12. An information processing apparatus comprising:

information input means for inputting original information from an input apparatus;

attribute information input means for inputting attribute information of the original information;

information combining means for combining the original information with the attribute information in accordance with a correspondence relationship therebetween to thereby produce information to be embedded;

embedding information producing means for producing embedding information from the information to be embedded;

apparatus mark image producing means for producing an apparatus mark image indicative of an output apparatus based on the information type of the original information;

image output means for printing the embedding information and the apparatus mark image on a recording medium;

image input means for read-scanning the embedding information to thereby input image information;

embedding information recognizing means for recognizing the embedding information from the inputted image information;

information resolving means for resolving the recognized embedding information into the original information and the attribute information so as to determine an output apparatus used to reproduce the original information in accordance with the attribute information corresponding thereto; and information output means for outputting the original information to the output apparatus.

13. An information processing apparatus comprising:

information input means for inputting original information from an input apparatus;

attribute information input means for inputting attribute information of the original information;

information combining means for combining the original information with the attribute information in accordance with a correspondence relationship therebetween to thereby produce information to be embedded;

embedding information producing means for producing embedding information from the information to be embedded; and apparatus mark image producing means for producing an apparatus mark image indicative of an output apparatus based on the information type of the original information;

image output means for printing the embedding information and the apparatus mark image on a recording medium.

14. An information processing apparatus comprising:

image input means for read-scanning embedding information printed on a medium to thereby input image information;

recognizing means for recognizing embedding information and an apparatus mark image from the inputted image information;

information resolving means for resolving the recognized embedding information into an original information and an attribute information;

determining means for determining the output apparatus used to reproduce the original information in accordance with one of the attribute information and the recognized apparatus mark image corresponding thereto; and information output means for outputting the original information to the output apparatus.

15. An information processing method comprising the steps of:

inputting original information from an input apparatus;

inputting attribute information of the original information, wherein the attribute information includes a file name of each piece of the original information when a plurality of pieces of the original information are stored;

combining the original information with the attribute information in accordance with a correspondence relationship therebetween to thereby produce information to be embedded;

producing embedding information from the information to be embedded;

printing the embedding information on a recording medium;

read-scanning the embedding information to thereby input image information;

recognizing the embedding information from the inputted image information;

resolving the recognized embedding information into the original information and the attribute information so as to determine an output apparatus used to reproduce the original information in accordance with the attribute information corresponding thereto; and outputting the original information to the output apparatus.

* * * * *

UNITED STATES PATENT AND TRADEMARK OFFICE
CERTIFICATE OF CORRECTION

PATENT NO. : 6,123,258
DATED : September 26, 2000
INVENTOR(S) : Hiroshi Iida

Page 1 of 1

It is certified that error appears in the above-identified patent and that said Letters Patent is hereby corrected as shown below:

Column 28, claim 8,
Line 46, "original in formation" should read -- original information --.

Signed and Sealed this

Fifth Day of March, 2002

Attest:

JAMES E. ROGAN
*Attesting Officer*  *Director of the United States Patent and Trademark Office*